United States Patent
Lee et al.

(10) Patent No.: US 11,152,642 B2
(45) Date of Patent: Oct. 19, 2021

(54) HYBRID ELECTROLYTE, AND ELECTRODE AND LITHIUM BATTERY EACH INCLUDING THE SAME

(71) Applicants: Samsung Electronics Co., Ltd., Suwon-si (KR); Samsung SDI Co., Ltd., Yongin-si (KR)

(72) Inventors: Myungjin Lee, Seoul (KR); Victor Roev, Hwaseong-si (KR); Wonseok Chang, Seoul (KR); Seoksoo Lee, Yongin-si (KR); Dongmin Im, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/567,091

(22) Filed: Sep. 11, 2019

(65) Prior Publication Data
US 2020/0136177 A1    Apr. 30, 2020

(30) Foreign Application Priority Data

Oct. 30, 2018    (KR) .................. 10-2018-0131105

(51) Int. Cl.
| | | |
|---|---|---|
| *H01M 10/0562* | (2010.01) | |
| *H01M 10/0525* | (2010.01) | |
| *H01M 10/0587* | (2010.01) | |

(52) U.S. Cl.
CPC ... *H01M 10/0562* (2013.01); *H01M 10/0525* (2013.01); *H01M 10/0587* (2013.01)

(58) Field of Classification Search
None
See application file for complete search history.

(56) References Cited

U.S. PATENT DOCUMENTS

| | | | |
|---|---|---|---|
| 9,093,722 B2 | 7/2015 | Zhang et al. | |
| 2015/0207176 A1 | 7/2015 | Moganty et al. | |
| 2016/0064785 A1* | 3/2016 | Kim | H01M 12/08 |
| | | | 429/405 |
| 2017/0077557 A1* | 3/2017 | Zheng | H01M 4/525 |
| 2017/0288269 A1 | 10/2017 | Moganty et al. | |

FOREIGN PATENT DOCUMENTS

KR    1020180057617 A    5/2018

OTHER PUBLICATIONS

Internet: IL screening: https://rstudio-pubs-static.s3.amazonaws.com/291697_34ff4f713b054ac3a9dca6c3d93a29a4.html, Retrieved on Oct. 15, 2019.
Pereiro et al., Fluorinated Ionic Liquids: Properties and Applications, ACS Sustainable Chemistry & Engineering, 1, 2013, 427-439.

* cited by examiner

*Primary Examiner* — Daniel S Gatewood
(74) *Attorney, Agent, or Firm* — Cantor Colburn LLP

(57) ABSTRACT

A hybrid electrolyte includes: an inorganic solid electrolyte; and an organic electrolyte, wherein the organic electrolyte includes an organic salt including an organic cation and an organic anion, and the organic cation includes a halogen. An electrode and a solid-state secondary battery each includes the hybrid electrolyte.

25 Claims, 3 Drawing Sheets

HYBRID ELECTROLYTE, AND ELECTRODE AND LITHIUM BATTERY EACH INCLUDING THE SAME

CROSS-REFERENCE TO RELATED APPLICATION

This application claims priority to and the benefit of Korean Patent Application No. 10-2018-0131105, filed on Oct. 30, 2018, in the Korean Intellectual Property Office, and all the benefits therefrom under 35 U.S.C. § 119, the content of which is incorporated herein in its entirety by reference.

BACKGROUND

1. Field

The present disclosure relates to a hybrid electrolyte, and an electrode and a lithium battery each including the same.

2. Description of the Related Art

Recently, batteries having high energy density and high safety have been actively developed. For example, lithium-ion batteries have been put to practical use in the automotive industry as well as in the information and communication equipment industries. Safety is very important to the automotive industry.

Lithium-ion batteries which are currently commercialized use an electrolytic solution including a flammable organic solvent, and thus there is the possibility of overheating and a fire when a short circuit occurs. As a result, solid-state batteries using a solid electrolyte, instead of an electrolytic solution, have been proposed.

Since a solid-state battery does not use a flammable organic solvent, even if a short circuit occurs, the possibility of explosion and a fire may be greatly reduced. Therefore, such a solid-state battery may greatly enhance safety as compared with a lithium-ion battery using an electrolytic solution.

However, in a solid-state battery, since the electrolyte is solid, when contact between an electrode active material and a solid electrolyte, and/or contact between solid electrolytes, are not sufficiently maintained, battery resistance is increased, and thus, it is difficult to provide good battery characteristics.

For the purpose of increasing contact between an anode layer and a solid electrolyte, a pressurizing process, such as isostatic pressing, can be applied in a process of manufacturing the solid-state battery. In isostatic pressing, a continuous process is difficult, much energy is used to provide high pressure, and a temperature increase used when sintering may be undesirable.

SUMMARY

Provided is a lithium battery with improved energy density, in which contact failure between an electrode active material and a solid electrolyte is avoided.

Additional aspects will be set forth in part in the description which follows and, in part, will be apparent from the description.

According to an aspect of an embodiment, a hybrid electrolyte includes: an inorganic solid electrolyte; and an organic electrolyte, wherein the organic electrolyte includes an organic salt including an organic cation and an organic anion, and the organic cation includes a halogen.

According to an aspect of another embodiment, an electrode includes: an electrode active material; and the hybrid electrolyte.

According to an aspect of yet another embodiment, a lithium battery includes: a cathode layer; an anode layer; and an electrolyte layer between the cathode layer and the anode layer, wherein at least one of the cathode layer, the anode layer, and the electrolyte layer includes the hybrid electrolyte.

Also disclosed is a method of manufacturing the hybrid solid electrolyte, the method including: contacting an inorganic solid electrolyte and an organic electrolyte, wherein the organic electrolyte includes an organic salt including an organic cation and an anion, and the organic cation includes a halogen.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
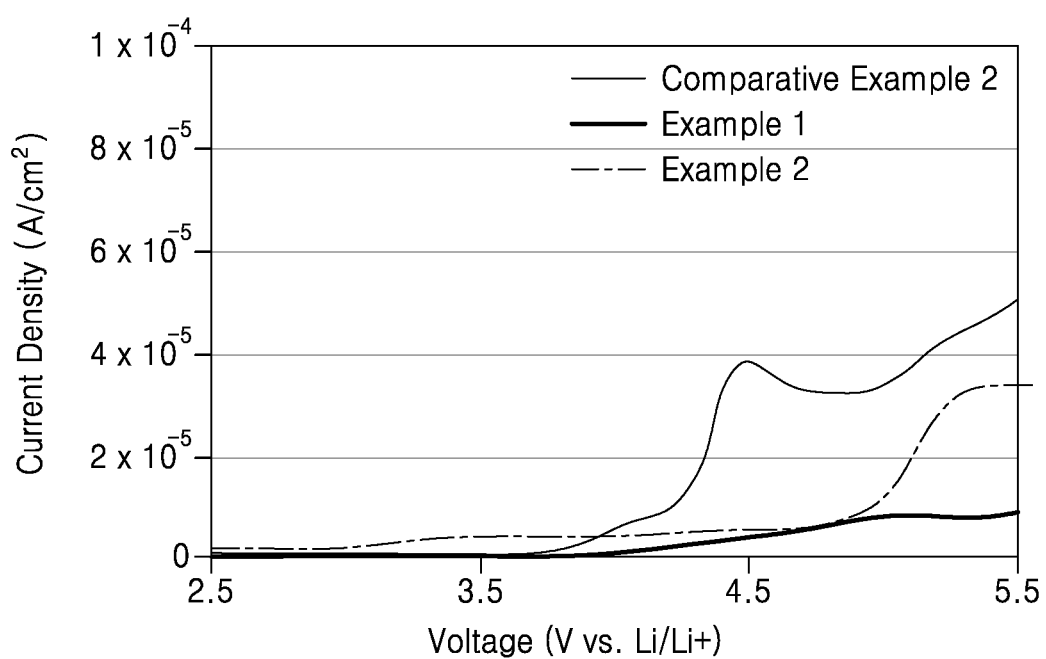
FIG. 1 is graph of current density (amperes per square centimeter, $A/cm^2$) versus voltage (Volts versus $Li/Li^+$) and is a linear sweep voltammogram of hybrid electrolytes prepared in Examples 1 and 2 and Comparative Example 1.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

The hybrid electrolyte will now be described more fully with reference to the accompanying drawings, in which example embodiments are shown. The hybrid electrolyte may, however, be embodied in many different forms, should not be construed as being limited to the embodiments set forth herein, and should be construed as including all modifications, equivalents, and alternatives within the scope of the present inventive concept; rather, these embodiments are provided so that this inventive concept will be thorough and complete, and will fully convey the effects and features of the present concept and ways to implement the present inventive concept to those skilled in the art.

The terminology used herein is for the purpose of describing particular embodiments only and is not intended to be limiting of the inventive concept. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the size or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. Although the terms "first," "second," etc., may be used herein to describe various elements, components, regions, and/or layers, these elements, components, regions, and/or layers should not be limited by these terms. These terms are used only to distinguish one component from another, not for purposes of limitation.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, a "hydrocarbyl" group means all types of functional groups consisting of carbons and hydrogens. The hydrocarbyl group substituted with a halogen refers to a functional group substituted with at least one halogen of hydrogens included in the hydrocarbyl group. For example, about 1% to about 95%, about 10% to about 95%, about 20% to about 90%, about 30% to about 90%, about 40% to about 90%, or about 50% to about 90% of the hydrogen atoms are substituted with halogens, based on a total content of hydrogen atoms included in the hydrocarbyl group.

"Alkyl" means a straight or branched chain, saturated, monovalent hydrocarbon group (e.g., methyl or hexyl). "Cycloalkyl" refers to a monovalent group having one or more saturated rings in which all ring members are carbon (e.g., cyclopentyl and cyclohexyl). The term "heterocycloalkyl" refers to a cycloalkyl group including at least one heteroatom selected from N, O, P, Si, and S. Here, the "cycloalkyl" group is the same as defined above. The term "halogen atom" includes fluorine, bromine, chlorine, or iodine.

"Alkoxy" means an alkyl group that is linked via an oxygen (i.e., alkyl-O—), for example methoxy, ethoxy, and sec-butyloxy groups. One or more hydrogen atoms of the alkoxy group may be substituted.

"Aryl" means a monovalent group formed by the removal of one hydrogen atom from one or more rings of an arene (e.g., phenyl or naphthyl). One or more hydrogen atoms in the aryl group may be substituted.

"Aryloxy" means an aryl moiety that is linked via an oxygen (i.e., —O-aryl). An aryloxy group includes a C6 to C30 aryloxy group, and specifically a C6 to C18 aryloxy group. Non-limiting examples include phenoxy, naphthyloxy, and tetrahydronaphthyloxy. One or more hydrogen atoms in the aryloxy group may be substituted. "Heteroaryl" refers to a monocyclic or bicyclic organic compound that includes at least one heteroatom selected from N, O, P, Si, and S, and the remaining ring atoms are C. For example, the heteroaryl group may include 1 to 5 heteroatoms and may include 5 to 10 ring members, wherein S and N may be oxidized to various oxidation states. Non-limiting examples of a monocyclic heteroaryl group include thienyl, furyl, pyrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isooxazol-3-yl, isooxazol-4-yl, isooxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, or 5-pyrimidin-2-yl. "Heteroaryl" also refers to a group in which a heteroaromatic ring is fused to one or more aryl, cycloalkyl, or heterocycloalkyl rings. Non-limiting examples of a bicyclic heteroaryl include indolyl, isoindolyl, indazolyl, indolizinyl, purinyl, quinolizinyl, quinolinyl, and isoquinolinyl. One or more hydrogen atoms in the heteroaryl group may be substituted. "Heteroaryloxy" refers to heteroaryl-O—, and the heteroaryl group is as described above. "Alkylene", "Arylene", "Heteroarylene", "Cycloalkylene", and "Heterocycloalkylene" refer to substituents, in which one hydrogen atom of an alkyl group, an aryl group, a heteroaryl group, a cycloalkyl group, and a heterocycloalkyl group is substituted with a radical. "Alkylene oxide" refers to alkylene-O—, and the alkylene group is the same as defined above. Non-limiting examples of an alkylene oxide group include ethylene oxide, and propylene oxide. The compound or group can be substituted with at least one divalent substituent instead of methylene group (—CH$_2$—).

The prefix "hetero" means that the compound or group includes at least one a heteroatom (e.g., 1, 2, or 3 heteroatom(s)), wherein the heteroatom(s) is each independently N, O, S, Si, or P.

"Substituted" means that the compound or group is substituted with at least one (e.g., 1, 2, 3, or 4) substituent, and the substituents are independently a hydroxyl (—OH), a C1-9 alkoxy, a C1-9 haloalkoxy, an oxo (═O), a nitro (—NO$_2$), a cyano (—CN), an amino (—NH$_2$), an azido (—N₃), an amidino (—C(=NH)NH₂), a hydrazino (—NHNH₂), a hydrazono (=N—NH₂), a carbonyl (—C(=O)—), a carbamoyl group (—C(O)NH₂), a sulfonyl group (—S(=O)₂—), a thiol group (—SH), a thiocyano (—SCN), a tosyl group (CH₃C₆H₄SO₂—), a carboxylic acid group (—C(=O)OH), a carboxylic C1 to C6 alkyl ester group (—C(=O)OR wherein R is a C1 to C6 alkyl group), a carboxylic acid salt group (—C(=O)OM) wherein M is an organic or inorganic cation, a sulfonic acid group (—SO₃H₂), a sulfonic mono- or dibasic salt group (—SO₃MH or —SO₃M₂ wherein M is an organic or inorganic cation), a phosphoric acid group (—PO₃H₂), a phosphoric acid mono- or dibasic salt group (—PO₃MH or —PO₃M₂ wherein M is an organic or inorganic cation), a C1 to C12 alkyl, a halogen atom substituted C1-C12 alkyl (example: CF₃, CHF₂, CH₂F, or CCl₃), a C3 to C12 cycloalkyl, a C2 to C12 alkenyl, a C5 to C12 cycloalkenyl, a C2 to C12 alkynyl, a C6 to C12 aryl, a C7 to C13 arylalkyl, a C4 to C12 heterocycloalkyl, or a C3 to C12 heteroaryl instead of hydrogen, provided that the substituted atom's normal valence is not exceeded. The indicated number of carbon atoms for any group herein is exclusive of any substituents.

Hereinafter, a hybrid electrolyte, and an electrode and a lithium battery including the same according to example embodiments will be described in more detail.

A hybrid electrolyte according to an embodiment includes an inorganic solid electrolyte; and an organic electrolyte, wherein the organic electrolyte includes an organic salt including an organic cation and an anion, and the organic cation includes a halogen.

While not wanting to be bound by theory, it is understood that because the hybrid electrolyte includes the organic electrolyte, and the organic electrolyte is located in a space between particles of the inorganic solid electrolyte, the interfacial resistance between particles of the inorganic solid electrolyte is reduced, and a volume change occurring during charge and discharge of the battery is reduced, preventing an increase in internal resistance due to cracks or the like of the solid electrolyte generated during charge and discharge. Further, since the organic electrolyte is located in a space between particles of the solid electrolyte, the density of an electrode including the hybrid electrolyte is improved compared to the density of an electrode including only the inorganic solid electrolyte. As a result, the energy density of the lithium battery including the hybrid electrolyte is improved. For example, an organic electrolyte in a liquid state and an inorganic solid electrolyte may be mixed at a temperature of 60° C. or higher and cooled to room temperature, thereby obtaining a hybrid electrolyte in which the organic electrolyte is uniformly filled between the inorganic solid electrolyte particles. Accordingly, the adhesion between the inorganic solid electrolytes is improved in the absence of a separate pressurizing process, such as an isotactic pressurizing process, as may be used for the inorganic solid electrolyte, and thus it is easier to prepare the hybrid electrolyte having a suitable form.

In the hybrid electrolyte, the organic salt includes the organic cation including a halogen to reduce the reactivity of the inorganic solid electrolyte with the organic salt. The reactivity of the inorganic solid electrolyte with the organic salt is reduced to suppress deterioration of the lithium battery adopting the hybrid electrolyte including the organic salt. The organic salt including the organic cation, without including the halogen has higher reactivity with the inorganic solid electrolyte. In the case where the organic salt including the organic cation without including halogen contacts the inorganic solid electrolyte, a crystal structure of the inorganic solid electrolyte may be broken or otherwise degraded by reaction of the inorganic solid electrolyte with the organic salt. Accordingly, the lithium transfer path of the inorganic solid electrolyte may collapse, so that the lithium ion conductivity of the solid electrolyte is reduced, and as a result, the lithium battery including the inorganic solid electrolyte deteriorates.

In the hybrid electrolyte, the organic cation includes at least one cation of a Group 15 element cation and a heterocyclic cation including 1 to 3 hetero atoms, wherein at least one hydrocarbyl group substituted with a halogen is linked to the Group 15 element and the heterocyclic ring, and wherein the hydrocarbyl group substituted with a halogen includes 6 or more carbons. The hydrocarbyl group substituted with halogen includes 6 or more carbons to further reduce the reactivity of the inorganic solid electrolyte with the organic salt. Therefore, the deterioration of the lithium battery adopting the hybrid electrolyte is more effectively suppressed. For example, because the organic cation includes the halogen, or the hydrocarbyl group substituted with halogen including 6 or more carbon atoms, the dielectric constant of the organic cation is decreased and the reactivity with the inorganic solid electrolyte is further reduced. The number of carbons included in the hydrocarbyl group substituted with the halogen is, for example, about 6 to about 30, about 6 to about 25, about 6 to about 20, about 6 to about 15, or about 6 to about 12. The hydrocarbyl group substituted with the halogen has carbon numbers in such a range, thereby further improving the stability of the lithium battery including the hybrid electrolyte.

The organic salt included in the hybrid electrolyte is represented by, for example, at least one of Formula 1 and Formula 2:

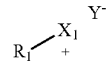

Formula 1

Formula 2

In Formula 1, X₁ is —N(R₂)(R₃)(R₄) or —P(R₂)(R₃)(R₄), and R₁, R₂, R₃ and R₄ are each independently an unsubstituted or halogen-substituted C1-C30 alkyl group, an unsubstituted or halogen-substituted C1-C30 alkoxy group, an unsubstituted or halogen-substituted C6-C30 aryl group, an unsubstituted or halogen-substituted C6-C30 aryloxy group, an unsubstituted or halogen-substituted C3-C30 heteroaryl group, an unsubstituted or halogen-substituted C3-C30 heteroaryloxy group, an unsubstituted or halogen-substituted C4-C30 cycloalkyl group, an unsubstituted or halogen-substituted C3-C30 heterocycloalkyl group, or an unsubstituted or halogen-substituted C2-C100 alkylene oxide group, with the proviso that at least one of R₁, R₂, R₃ and R₄ is a C6-C12 alkyl group partially or fully substituted with halogens or a C6-C30 aryl group partially or fully substituted with halogens.

In Formula 2,

is a heterocycloalkyl group or a heteroaryl group, each including 1 to 3 heteroatoms and 2 to 30 carbon atoms, in which the ring is unsubstituted or substituted with a substituent, $X_2$ is —N($R_5$)($R_6$)—, —N($R_5$)═, —P($R_5$)═, or —P($R_5$)($R_6$)—, and the substituent substituted in the ring, and $R_5$ and $R_6$ are each independently hydrogen, an unsubstituted or halogen-substituted C1-C30 alkyl group, an unsubstituted or halogen-substituted C1-C30 alkoxy group, an unsubstituted or halogen-substituted C6-C30 aryl group, an unsubstituted or halogen-substituted C6-C30 aryloxy group, an unsubstituted or halogen-substituted C3-C30 heteroaryl group, an unsubstituted or halogen-substituted C3-C30 heteroaryloxy group, an unsubstituted or halogen-substituted C4-C30 cycloalkyl group, an unsubstituted or halogen-substituted C3-C30 heterocycloalkyl group, or an unsubstituted or halogen-substituted C2-C100 alkylene oxide group, with the proviso that the substituent substituted in the ring and at least one of $R_5$ and $R_6$ are a C6-C12 alkyl group partially or fully substituted with halogens or a C6-C30 aryl group partially or fully substituted with halogens, and $Y^-$ is an anion.

The organic salt included in the hybrid electrolyte is represented by, for example, at least one of Formula 3 and Formula 4:

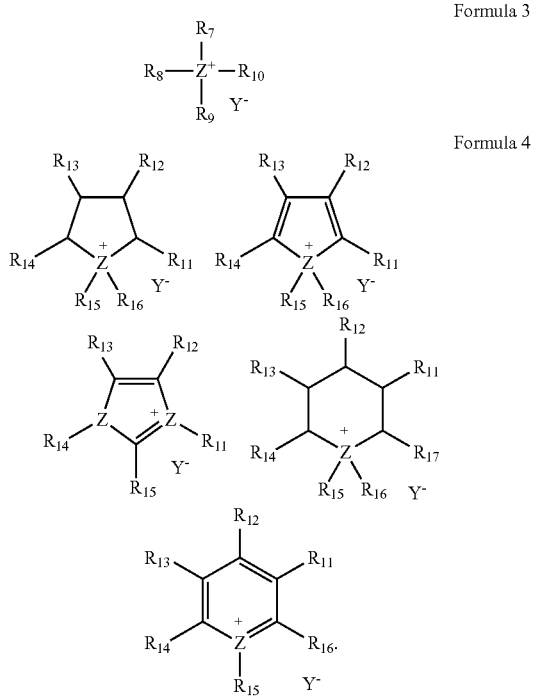

Formula 3

Formula 4

In Formula 3, Z is N or P, and $R_7$, $R_8$, $R_9$ and $R_{10}$ are each independently an unsubstituted or halogen-substituted C1-C30 alkyl group, an unsubstituted or halogen-substituted C6-C30 aryl group, an unsubstituted or halogen-substituted C3-C30 heteroaryl group, an unsubstituted or halogen-substituted C4-C30 cycloalkyl group, or an unsubstituted or halogen-substituted C3-C30 heterocycloalkyl group, with the proviso that at least one of $R_7$, $R_8$, $R_9$ and $R_{10}$ is a C6-C12 alkyl group partially or fully substituted with halogens or a C6-C30 aryl group partially or fully substituted with halogens.

In Formula 4, Z is N or P, $R_{11}$, $R_{12}$, $R_{13}$, $R_{14}$, $R_{15}$, $R_{16}$, and $R_{17}$ are each independently hydrogen, an unsubstituted or halogen-substituted C1-C30 alkyl group, an unsubstituted or halogen-substituted C6-C30 aryl group, an unsubstituted or halogen-substituted C3-C30 heteroaryl group, an unsubstituted or halogen-substituted C4-C30 cycloalkyl group, or an unsubstituted or halogen-substituted C3-C30 heterocycloalkyl group, with the proviso that at least one of $R_{11}$, $R_{12}$, $R_{13}$, $R_{14}$, $R_{15}$, $R_{16}$, and $R_{17}$ is a C6-C12 alkyl group partially or fully substituted with halogens or a C6-C30 aryl group partially or fully substituted with halogens, and $Y^-$ is an anion.

The organic salt included in the hybrid electrolyte is represented by, for example, Formulas 5 to 10:

Formula 5

Formula 6

Formula 7

Formula 8

Formula 9

Formula 10

In Formulas 5 to 10, $R_{18}$, $R_{19}$, $R_{20}$ and $R_{21}$ are each independently an unsubstituted or halogen-substituted C1-C30 alkyl group, an unsubstituted or halogen-substituted C6-C30 aryl group, an unsubstituted or halogen-substituted C3-C30 heteroaryl group, an unsubstituted or halogen-substituted C4-C30 cycloalkyl group, or an unsubstituted or halogen-substituted C3-C30 heterocycloalkyl group, with the proviso that at least one of $R_{18}$, $R_{19}$, $R_{20}$ and $R_{21}$ is a C6-C12 alkyl group partially or fully substituted with halogens or a C6-C30 aryl group partially or fully substituted with halogens.

In Formulas 5 to 10, $R_{22}$, $R_{23}$, $R_{24}$, $R_{25}$, $R_{26}$, $R_{27}$, and $R_{28}$ are each independently hydrogen, an unsubstituted or halogen-substituted C1-C30 alkyl group, an unsubstituted or halogen-substituted C6-C30 aryl group, an unsubstituted or halogen-substituted C3-C30 heteroaryl group, an unsubstituted or halogen-substituted C4-C30 cycloalkyl group, or an unsubstituted or halogen-substituted C3-C30 heterocycloalkyl group, with the proviso that at least one of $R_{22}$, $R_{23}$, $R_{24}$, $R_{25}$, $R_{26}$, $R_{27}$, and $R_{28}$ is a C6-C12 alkyl group partially or fully substituted with halogens or a C6-C30 aryl group partially or fully substituted with halogens, and $Y^-$ is an anion.

In the organic salt represented by at least one of Formulas 1 to 10 included in the hybrid electrolyte, the halogen included in the organic cation is, for example, fluorine (F). The organic cation includes fluorine (F), and thus, for example, the reactivity of the organic salt with the solid electrolyte is more effectively suppressed.

The anion included in the organic salt of the hybrid electrolyte include at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^-$, $PF_6^-$, $ClO_4^-$, $BOB^-$ (bis(oxalate)borate)$^-$, $CF_3SO_3^-$, $CF_3CO_2^-$, $(C_2F_5SO_2)_2N^-$, $(C_2F_5SO_2)(CF_3SO_2)N^-$ and $(CF_3SO_2)_2N^-$. In an aspect, the anion included in the organic salts represented by at least one of Formulas 1 to 10 are the same as the above-mentioned anion.

The viscosity of the organic salt included in the hybrid electrolyte is about 500 centipoise (cps) to about 10,000 cps, or about 500 cps to about 5,000 cps at 25° C. Because the organic salt has such a viscosity range, it may be easier to form the hybrid electrolyte into a suitable form. If the viscosity of the organic salt is too low, the volatility increases. Accordingly, the contact between the inorganic solid electrolytes in the charging and discharging process of the lithium battery is reduced to promote the deterioration of the lithium battery. When the viscosity of the organic salt is too high, uniform mixing with the inorganic solid electrolyte is difficult and thus it is difficult to apply the organic salt to the process.

The dielectric constant of the organic salt included in the hybrid electrolyte is, for example, about 10 or less, about 9.5 or less, about 9 or less, about 8.5 or less, about 8 or less, about 7.5 or less, about 7 or less, about 6.5 or less, about 6 or less, about 5.5 or less, or about 5 or less, e.g. about 0.1 to about 10, or about 1 to about 9. As the dielectric constant of the organic salt is lowered, the reactivity with the inorganic solid electrolyte is reduced, and thus the deterioration of the lithium battery including the hybrid electrolyte is more effectively suppressed. The dielectric constant of the organic salt is the relative value of the permittivity of the organic salt to the permittivity of the vacuum.

The organic electrolyte included in the hybrid electrolyte further includes a lithium salt. By including the lithium salt, the ion conductivity of the hybrid electrolyte is further improved.

The lithium salt including the hybrid electrolyte is at least one of, for example, $LiPF_6$, $LiBF_4$, $LiCF_3SO_3$, $Li(CF_3SO_2)_2N$, $LiC_2F_5SO_3$, $Li(FSO_2)_2N$, $LiC_4F_9SO_3$, $LiN(SO_2CF_2CF_3)_2$, and compounds represented by Formulas 11 to 14, but is not limited thereto, and any suitable lithium salt may be used:

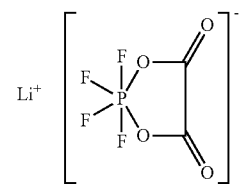

Formula 11

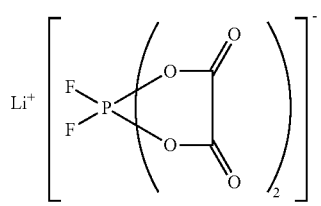

Formula 12

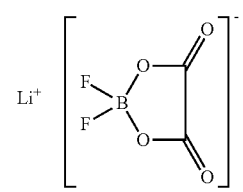

Formula 13

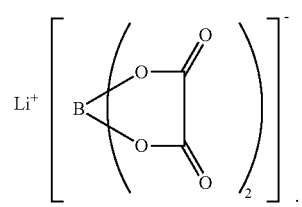

Formula 14

The concentration of the lithium salt included in the organic electrolyte is about 0.01 molar (M) to about 2 M, about 0.1 M to about 1.5 M, about 0.5 M to about 1.5 M, or about 0.8 M to about 1.2 M. The organic electrolyte includes such a range of lithium salt to more effectively suppress the deterioration of the lithium battery including the organic electrolyte.

The molecular weight of the organic salt is about 1500 Daltons or less, about 1000 Daltons or less, about 900 Daltons or less, about 800 Daltons or less, or about 700 Daltons or less, or about 90 Daltons to about 1500 Daltons, or about 120 Daltons to about 1000 Daltons. The organic salt has such a range of molecular weight to further improve the ionic conductivity of the hybrid electrolyte including the organic salt.

The organic electrolyte may not include a polymer and/or an oligomer including a cation and/or anion moiety. The organic electrolyte may not include a polymer and/or an oligomer including a plurality of repeating units including a cation and/or anion moiety.

Accordingly, since the organic electrolyte does not include the polymer and/or an oligomer including a cation and/or anion moiety, the viscosity of the organic electrolyte is reduced, thereby facilitating preparation of the hybrid electrolyte including the organic electrolyte.

The inorganic solid electrolyte included in the hybrid electrolyte may be at least one of a sulfide-based solid electrolyte and an oxide-based solid electrolyte, but is not necessarily limited thereto, and may comprise any suitable inorganic solid electrolyte.

The inorganic solid electrolyte is, for example, a sulfide-based solid electrolyte. The sulfide-based solid electrolyte is at least one selected from, for example, $Li_2S$—$P_2S_5$, $Li_2S$—

$P_2S_5$—LiX, wherein X is a halogen element, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, wherein m and n are positive numbers, Z is one of Ge, Zn or Ga, $Li_2S$—$GeS_2$, $Li_2S$—$SiS_2$—$Li_3PO_4$, $Li_2S$—$SiS_2$-$Li_pMO_q$, wherein p and q are positive numbers, M is one of P, Si, Ge, B, Al, Ga In, $Li_{7-x}PS_{6-x}Cl_x$ wherein $0<x<2$, $Li_{7-x}PS_{6-x}Br_x$ wherein $0<x<2$, and $Li_{7-x}PS_{6-x}I_x$ wherein $0<x<2$. Mentioned is at least one of $Li_6PS_5Cl$, $Li_6PS_5Br$, and $Li_6PS_5I$. By using the organic salt described above, the reactivity of the organic salt with the sulfide-based solid electrolyte is remarkably reduced.

Alternatively, or in addition, the inorganic solid electrolyte is, for example, an oxide-based solid electrolyte. The oxide-based solid electrolyte is at least one of $Li_{1+x+y}Al_xTi_{2-x}Si_yP_{3-y}O_{12}$ wherein $0<x<2$, $0\leq y<3$, $BaTiO_3$, $Pb(Zr_xTi_{1-x})O_3$ wherein $0\leq x\leq 1$ (PZT), $Pb_{1-x}La_xZr_{1-y}Ti_yO_3$ (PLZT) wherein $0\leq x<1$, $0\leq y<1$, $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$ wherein $0<x<2$ and $0<y<3$, lithium aluminum titanium phosphate ($Li_xAl_yTi_z(PO_4)_3$ wherein $0<x<2$, $0<y<1$ and $0<z<3$, $Li_{1+x+y}(Al_a Ga_{1-a})_x(Ti_bGe_{1-b})_{2-x}Si_yP_{3-y}O_{12}$ wherein $0\leq x\leq 1$, $0\leq y\leq 1$, $0\leq a\leq 1$, and $0\leq b\leq 1$), lithium lanthanum titanate ($Li_xLa_yTiO_3$ wherein $0<x<2$, $0<y<3$, lithium germanium thiophosphate ($Li_xGe_yP_zS_w$ wherein $0<x<4$, $0<y<1$, $0<z<1$ and $0<w<5$, lithium nitride glass ($Li_xN_y$ wherein $0<x<4$ and $0<y<2$, $SiS_2$ ($Li_xSi_yS_z$ wherein $0<x<3$, $0<y<2$ and $0<z<4$, $P_2S_5$-based glass ($Li_xP_yS_z$ wherein $0<x<3$, $0<y<3$ and $0<z<7$, $Li_2O$, LiF, LiOH, $Li_2CO_3$, $LiAlO_2$, a $Li_2O$—$Al_2O_3$—$SiO_2$—$P_2O_5$—$TiO_2$—$GeO_2$-based ceramic, and a garnet-based ceramics of the formula $Li_{3+x}La_3M_2O_{12}$ wherein M is Te, Nb, or Zr and x is an integer of 1 to 10, or a combination thereof. By using the organic salt described above, the reactivity of the organic salt with the oxide-based solid electrolyte is reduced at a high temperature.

The mixing ratio of the inorganic solid electrolyte and the organic electrolyte included in the hybrid electrolyte may be in the range of about 1:99 to about 99:1, about 5:95 to about 95:5, about 10:90 to about 90:10, about 20:80 to about 80:20, about 30:70 to about 70:30, or about 40:60 to about 60:40, by weight. The hybrid electrolyte includes the inorganic solid electrolyte and the organic electrolyte in the range, so that the interfacial resistance between the inorganic solid electrolytes is effectively reduced.

The hybrid electrolyte has an oxidation current density measured by linear sweep voltammetry at 25° C. of $1\times 10^{-5}$ $A/cm^2$ or less up to 4.4 V with respect to lithium metal. For example, when the oxidation current density measured by the linear sweep voltammetry at 25° C. is $1\times 10^{-5}$ $A/cm^2$ or less with respect to lithium metal, the voltage of the hybrid electrolyte is about 3.9 volts (V) or more, about 4.0 V or more, about 4.1 V or more, about 4.2 V or more, about 4.3 V or more, or about 4.4 V or more, e.g., about 3.9 V to about 10 V, about 4 V to about 9 V, about 4.2 V to about 8 V, about 4.2 V to about 7 V, about 4.2 V to about 6.5 V, or about 4.2 V to about 6 V. The hybrid electrolyte having the foregoing voltage window is electrochemically stable in a wide range, thereby improving cycle characteristics of the lithium battery including the hybrid electrolyte.

In the hybrid electrolyte, the average ionic conductivity of the hybrid electrolyte in the range of about $10^3$ Hertz (Hz) to about $10^5$ Hz measured by a DC polarization method at 60° C. is, for example, 50% or more, 60% or more, 70% or more, and 80% or more, or about 50% to about 99%, or about 60% to about 95%, of an average ionic conductivity of the inorganic solid electrolyte included in the hybrid electrolyte. The hybrid electrolyte has an ionic conductivity of 50% or more as compared with the inorganic solid electrolyte to suppress an increase in internal resistance of the lithium battery including the hybrid electrolyte.

After left for 12 hours in the hybrid electrolyte in which the inorganic solid electrolyte and the organic electrolyte are mixed at a weight ratio of 1:9 at 60° C., the amount of halogen ions eluted in the organic electrolyte is, for example, 50 parts per million (ppm) or less, 45 ppm or less, 40 ppm or less, 35 ppm or less, 30 ppm or less, 25 ppm or less, 20 ppm or less, 15 ppm or less, or 10 ppm or less, or about 0.1 ppm to about 50 ppm, or about 1 ppm to about 25 ppm. The organic electrolyte includes the organic salt described above, so that the reactivity of the organic salt with the inorganic solid electrolyte is reduced. The amount of halogen ions eluted from the inorganic solid electrolyte in the organic electrolyte is remarkably reduced. Accordingly, the deterioration of the lithium battery including the hybrid electrolyte is suppressed. The halogen ion is, for example, a chloride ion.

An electrode according to another embodiment includes an electrode active material and the above-described hybrid electrolyte.

The electrode includes, for example, a plurality of electrode active material particles, and the organic electrolyte included in the hybrid electrolyte is disposed between particles of the plurality of electrode active material particles. Accordingly, the interfacial resistance between the electrode active material particles decreases, and thus the internal resistance of the lithium battery adopting such an electrode decreases. Also, the density of the electrode is improved. The density of an electrode active material layer including the electrode active material and the hybrid electrolyte is, for example, about 3.0 $g/cm^3$ or more, about 3.1 $g/cm^3$ or more, or about 3.2 $g/cm^3$ or more, or about 3 $g/cm^3$ to about 6 $g/cm^3$, or about 3.2 $g/cm^3$ to about 5 $g/cm^3$. The density of the electrode including the hybrid electrolyte may be improved by about 3% or more, about 4% or more, about 5% or more or about 6% or more, or about 3% to about 50%, or about 5% to about 40%, as compared with the density of the electrode including only the inorganic solid electrolyte. Accordingly, the energy density of the lithium battery adopting the electrode including the hybrid electrolyte is improved.

The electrode may be, for example, a cathode including a cathode active material. The cathode active material includes, for example, a lithium transition metal oxide having a layered rock-salt structure. Alternatively, the electrode is, for example, an anode including an anode active material. The anode active material includes, for example, amorphous carbon, crystalline carbon, metal, or a metalloid which forms an alloy or compound with lithium. The cathode including the cathode active material and the anode including the anode active material will be described in more detail in the following of a lithium battery.

A lithium battery according to another embodiment includes a cathode layer; an anode layer; and an electrolyte layer between the cathode layer and the anode layer, and at least one of the cathode layer, the anode layer, and the electrolyte layer includes the above-described hybrid electrolyte. The lithium battery includes the hybrid electrolyte to suppress the deterioration of the lithium battery. The electrolyte layer included in the lithium battery is, for example, a solid. The electrolyte layer includes, for example, an inorganic solid electrolyte. The lithium battery includes a primary battery and a secondary battery, and includes a solid-state lithium battery, a lithium ion battery, a lithium air battery, a lithium sulfur battery, and the like.

The lithium battery may be, for example, a solid-state secondary battery.

Figure 3:
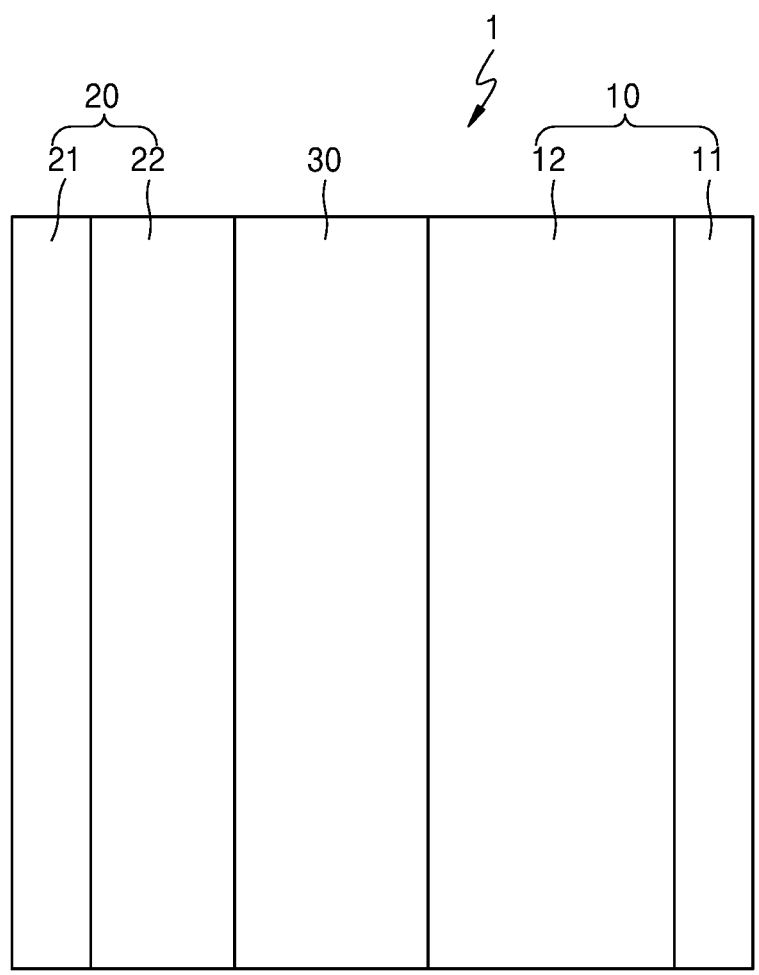
FIG. 3 is a cross-sectional view of a lithium battery according to an example embodiment.

Referring to FIG. 3, a solid-state secondary battery 1 includes an anode layer 20 including an anode active material layer 22; a cathode layer 10 including a cathode active material layer 12; and a solid electrolyte layer 30 located between the anode layer 20 and the cathode layer 10.

(Cathode Layer)

Referring to FIG. 3, the cathode layer 10 includes a cathode current collector 11 and a cathode active material layer 12. The cathode layer 10 may include the hybrid electrolyte described above.

The cathode active material layer 12 includes, for example, a cathode active material and a hybrid electrolyte. The solid electrolyte included in the hybrid electrolyte included in the cathode layer 10 may be similar to or different from the solid electrolyte included in the solid electrolyte layer 30. The detailed contents of the solid electrolyte refer to the hybrid electrolyte and/or the solid electrolyte layer 30 portion.

The cathode active material may be a cathode active material capable of reversibly absorbing and desorbing lithium ions. The cathode active material includes, for example, a lithium transition metal oxide such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, and lithium iron phosphate, nickel sulfide, copper sulfide, lithium sulfide, iron oxide, or vanadium oxide, but is not limited thereto, and any suitable cathode active materials may be used. The cathode active material may be either a single material or a mixture of materials.

The lithium transition metal oxide is, for example, a compound represented by any one of Formulae of $Li_aA_{1-b}B'_bD_2$ (where, $0.90 \leq a \leq 1$, and $0 \leq b \leq 0.5$); $Li_aE_{1-b}B'_bO_{2-c}D_c$ (where, $0.90 \leq a \leq 1$, $0 \leq b \leq 0.5$, $0 \leq c \leq 0.05$); $LiE_{2-b}B'_bO_{4-c}D_c$ (where, $0 \leq b \leq 0.5$, $0 \leq c \leq 0.05$); $Li_aNi_{1-b-c}Co_bB'_cD_\alpha$ (where, $0.90 \leq a \leq 1$, $0 \leq b \leq 0.5$, $0 \leq c \leq 0.05$, $0 < \alpha \leq 2$); $Li_aNi_{1-b-c}Co_bB'_cO_{2-\alpha}F'_\alpha$ (where, $0.90 \leq a \leq 1$, $0 \leq b \leq 0.5$, $0 \leq c \leq 0.05$, $0 < \alpha \leq 2$); $Li_aNi_{1-b-c}Co_bB'_cO_{2-\alpha}F'_\alpha$ (where, $0.90 \leq a \leq 1$, $0 \leq b \leq 0.5$, $0 \leq c \leq 0.05$, $0 < \alpha \leq 2$); $Li_aNi_{1-b-c}Mn_bB'_cD_\alpha$ (where, $0.90 \leq a \leq 1$, $0 \leq b \leq 0.5$, $0 \leq c \leq 0.05$, $0 < \alpha \leq 2$); $Li_aNi_{1-b-c}Mn_bB'_cO_{2-\alpha}F'_\alpha$ (where, $0.90 \leq a \leq 1$, $0 \leq b \leq 0.5$, $0 \leq c \leq 0.05$, $0 < \alpha \leq 2$); $Li_aNi_{1-b-c}Mn_bB'_cO_{2-\alpha}F'_\alpha$ (where, $0.90 \leq a \leq 1$, $0 \leq b \leq 0.5$, $0 \leq c \leq 0.05$, $0 \leq a \leq 2$); $Li_aNi_bE_cG_dO_2$ (where, $0.90 \leq a \leq 1$, $0 \leq b \leq 0.9$, $0 \leq c \leq 0.5$, $0.001 \leq d \leq 0.1$); $Li_aNi_bCo_cMn_dGeO_2$ (where, $0.90 \leq a \leq 1$, $0 \leq b \leq 0.9$, $0 \leq c \leq 0.5$, $0 \leq d \leq 0.5$, $0.001 \leq e \leq 0.1$); $Li_aNiG_bO_2$ (where, $0.90 \leq a \leq 1$, $0.001 \leq b \leq 0.1$); $Li_aCoG_bO_2$ (where, $0.90 \leq a \leq 1$, $0.001 \leq b \leq 0.1$); $Li_aMnG_bO_2$ (where, $0.90 \leq a \leq 1$, $0.001 \leq b \leq 0.1$); $Li_aMn_2G_bO_4$ (where, $0.90 \leq a \leq 1$, $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$. In these compounds, A is Ni, Co, Mn, or a combination thereof; B' is Al, Ni, Co, Mn, Cr, Fe, Mg, Sr, V, a rare earth element or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof. The cathode active material may comprise a coating layer on a surface thereof, and may comprise a mixture of the above-described compound and a compound having a coating layer. The coating layer on a surface of the cathode active material may include, for example, an oxide of a coating element, a hydroxide of a coating element, an oxyhydroxide of a coating element, an oxycarbonate of a coating element, or a coating element compound of hydroxycarbonate of a coating element. The compound forming the coating layer is amorphous or crystalline. The coating element included in the coating layer may be at least one of Mg, Al, Co, K, Na, Ca, Si, Ti, V, Sn, Ge, Ga, B, As, and Zr. A method of forming the coating layer is selected within a range that does not adversely affect the physical properties of the cathode active material. The coating method includes, for example, spray coating, immersing, and the like. The specific coating method is well understood by those skilled in the art, so a detailed description thereof will be omitted.

The cathode active material includes, for example, a lithium salt of a transition metal oxide having a layered rock salt type structure among the above-described lithium transition metal oxides. The "layered rock salt type structure" is a structure in which an oxygen atom layer and a metal atom layer are regularly arranged in a <111> direction of a cubic rock salt type structure and each atom layer forms a two-dimensional plane. The "cubic rock salt type structure" represents a NaCl type structure which is a kind of crystal structure, and specifically, represents a structure in which face centered cubic lattices (fcc) formed by a cation and an anion are misaligned to each other by ½ of the ridge of a unit lattice. The lithium transition metal oxide having such a layered rock salt type structure is a ternary lithium transition metal oxide such as $LiNi_xCo_yAl_zO_2$ (NCA) or $LiNi_xCo_yMn_zO_2$ (NCM) wherein $0<x<1$, $0<y<1$, $0<z<1$, and $x+y+z=1$). When the cathode active material includes the ternary lithium transition metal oxide having the layered rock salt type structure, the energy density and thermal stability of the solid-state secondary battery 1 are further improved.

The cathode active material may be covered with the coating layer. The coating layer may be any suitable coating layer for a cathode active material of the solid-state secondary battery. The coating layer is, for example, $Li_2O$—$ZrO_2$, or the like.

When the cathode active material includes nickel (Ni) as a ternary lithium transition metal oxide such as NCA or NCM, the specific capacity and/or energy density of the solid-state secondary battery 1 may be increased to reduce the metal elution of the cathode active material in a charged state. As a result, cycle characteristics in the charged state of the solid-state secondary battery 1 are improved.

The shape of the cathode active material is, for example, a particle shape such as a sphere or an elliptical sphere. The particle size of the cathode active material is not particularly limited and may be in a range applicable to the cathode active material of the existing solid-state secondary battery. The amount of the cathode active material of the cathode layer 10 is not particularly limited thereto and in a range applicable to the cathode layer of the existing solid-state secondary battery.

The cathode current collector 11 uses a plate, a foil, or the like comprising, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 11 may be omitted.

The cathode layer 10 may further include additives such as a conductive agent, a binder, a filler, a dispersant, and an ion conductive auxiliary agent in addition to the cathode active material and the hydbridelectrolyte described above. Such a conductive agent may be, for example, acetylene black, ketjen black, natural graphite, artificial graphite, carbon black, carbon fiber, metal powder such as copper, nickel, aluminum and silver, metal fiber, or the like, and may also be a combination of conductive materials such as a polyphenylene derivative. The binder may be, for example, a vinylidene fluoride/hexafluoropropylene copolymer, polyvinylidene fluoride (PVDF), polyacrylonitrile, polymethyl methacrylate, polytetrafluoroethylene, and mixtures thereof, or a styrene butadiene rubber-based polymer. As a filler, a dispersant, an ion conductive auxiliary agent and the like which may be mixed with the cathode layer 10, known materials used for the electrode of the solid-state secondary battery are generally used.

Anode Layer

Referring to FIG. 4, the anode layer 20 includes an anode current collector 21 and an anode active material layer 22. The anode layer 20 may include or not a hybrid electrolyte.

The anode active material layer 22 includes, for example, an anode active material and a hybrid electrolyte.

The anode active material included in the anode active material layer 22 may have, for example, a particle shape. An average particle size of the anode active material having the particle shape may be, for example, about 4 micrometers μm or less, about 3 μm or less, about 2 μm or less, about 1 μm or less, or about 900 nanometers (nm) or less, e.g., about 10 nm to about 4 μm, or about 0.1 μm to about 3 μm. The average particle size of the anode active material having the particle shape is, for example, about 10 nm to about 4 μm, about 10 nm to about 3 μm, about 10 nm to about 2 μm, about 10 nm to about 1 μm, or about 10 nm to about 900 nm. The anode active material has the average particle size in such a range to further facilitate reversible absorbing and/or desorbing of lithium during charge and discharge. The average particle size of the anode active material is, for example, a median diameter (D50) measured by laser light scattering particle size distribution meter.

The anode active material included in the anode active material layer 22 is, for example, a carbon-based anode active material and/or a non-carbon-based anode active material.

The carbon-based anode active material may be at least one of crystalline carbon and amorphous carbon. The crystalline carbon may be graphite such as a non-shaped, plate-shaped, flake-shaped, spherical, or fibrous natural graphite or artificial graphite, and the amorphous carbon may be soft carbon (low-temperature sintered carbon) or hard-carbon, mesophase pitch carbonization products, sintered coke, and the like. The amorphous carbon may be, for example, carbon black (CB), acetylene black (AB), furnace black (FB), ketjen black (KB), graphene, and the like, but is not limited thereto, any suitable amorphous carbon can be used.

The metal or metalloid anode active material may include at least one of gold (Au), platinum (Pt), palladium (Pd), silicon (Si), silver (Ag), aluminum (Al), bismuth (Bi), tin (Sn), and zinc (Zn), and is not limited thereto, and any suitable metal anode active material or metalloid anode active material forming an alloys or compound with lithium in the art may be used. For example, nickel (Ni) is not the metal anode active material because nickel (Ni) does not form an alloy with lithium.

The anode active material included in the anode active material layer 22 may be a non-carbon-based anode active material. For example, a non-carbon-based anode active material is at least one of a metal capable of forming an alloy with lithium, an alloy of a metal capable of forming an alloy with lithium, and an oxide of a metal capable of forming an alloy with lithium. Examples of the metal capable of alloying with lithium may be Si, Sn, Al, Ge, Pb, Bi, Sb, a Si—Y' alloy (Y' is at least one of an alkali metal, an alkaline earth metal, a Group 13 to 16 element, a transition metal, and a rare earth element, and not Si), a Sn—Y' alloy (Y' is at least one of an alkali metal, an alkaline earth metal, a Group 13 to 16 element, a transition metal, and a rare earth element, and not Sn), and the like. The element Y' may be at least one of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, or Po. For example, the transition metal oxide is a lithium titanium oxide, a vanadium oxide, a lithium vanadium oxide, and the like. For example, the non-transition metal oxide is $SnO_2$, $SiO_x$ wherein $0<x<2$, and the like. The non-carbon-based anode active material may be, for example, Si, Sn, Pb, Ge, Al, $SiO_x$ wherein $0<x<2$, $SnO_y$ wherein $0<y<2$, $Li_4Ti_5O_{12}$, $TiO_2$, $LiTiO_3$, and $Li_2Ti_3O_7$, but is not limited thereto and any suitable anode active materials used in the art as the non-carbon-based anode active material may be used.

The anode current collector 21 may comprise, for example, a material which does not react with lithium, that is, does not form both an alloy and a compound. The material forming the anode current collector 21 may be, for example, copper (Cu), stainless steel, titanium (Ti), iron (Fe), cobalt (Co), and nickel (Ni), and is not limited thereto, and any suitable material used as the electrode current collector in the art may be used. The anode current collector 21 may be made of one kind of the above-described metals, or an alloy or a coating material of two or more kinds of metals. The anode current collector 21 has, for example, a plate shape or a foil shape.

The anode active material layer 22 may further include an additive, such as a filler, a dispersant, a conductive agent, a binder, and the like suitable for a solid-state secondary battery 1. The anode active material layer 22 uses, for example, a material selected from a filler, a dispersant, a conductive agent, and a binder used in the above-described cathode active material layer 12.

Solid Electrolyte Layer

Referring to FIG. 3, the electrolyte layer 30 includes the solid electrolyte layer 30 located between the cathode layer 10 and the anode layer 20. The solid electrolyte layer 30 may include or not a hybrid electrolyte.

The solid electrolyte is, for example, a sulfide-based solid electrolyte. The sulfide-based solid electrolyte is at least one selected from, for example, $Li_2S$—$P_2S_5$, $Li_2S$—$P_2S_5$—LiX, wherein X is a halogen element, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, wherein m and n are positive numbers, Z is one of Ge, Zn or Ga, $Li_2S$—$GeS_2$, $Li_2S$—$SiS_2$—$Li_3PO_4$, $Li_2S$—$SiS_2$-$Li_pMO_q$, wherein p and q are positive numbers, M is one of P, Si, Ge, B, Al, Ga In. The sulfide-based solid electrolyte is prepared, for example, by treating a starting material such as $Li_2S$ and $P_2S_5$ by a melt-quenching method, a mechanical milling method, or the like. Further, after such treatment, a heat treatment may be performed. The sulfide-based solid electrolyte may be amorphous, crystalline, or a mixed state thereof.

In addition, the solid electrolyte may include, for example, sulfur (S), phosphorus (P), and lithium (Li) as at least a constituent element of the above-described sulfide-based solid electrolyte material. For example, the solid electrolyte may be a material including $Li_2S$—$P_2S_5$. When a material including $Li_2S$—$P_2S_5$ is used as the sulfide-based solid electrolyte material for forming the solid electrolyte, a mixed molar ratio of $Li_2S$ and $P_2S_5$ is in a range of, for example, $Li_2S:P_2S_5$=50:50 to 90:10. Particularly, the sulfide-based solid electrolyte included in the solid electrolyte may be an argyrodite-type compound including at least one of $Li_{7-x}PS_{6-x}Cl_x$ wherein 0<x<2, $Li_{7-x}PS_{6-x}Br_x$ wherein 0<x<2, and $Li_{7-x}PS_{6-x}I_x$ wherein 0<x<2. The argyrodite-type sulfide-based solid electrolyte is, for example, $Li_6PS_5Cl$, $Li_6PS_5Br$, and $Li_6PS_5I$.

Alternatively, the solid electrolyte is, for example, an oxide-based solid electrolyte. The oxide-based solid electrolyte is at least one selected from, for example, $Li_{1+x+y}Al_xTi_{2-x}Si_yP_{3-y}O_{12}$ wherein 0<x<2 and 0≤y<3, $BaTiO_3$, $Pb(Zr_aTi_{1-a})O_3$ wherein 0≤a≤1 (PZT), $Pb_{1-x}La_xZr_{1-y}Ti_yO_3$ (PLZT) wherein 0≤x<1 and 0≤y<1, $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$) wherein 0<x<2 and 0<y<3, lithium aluminum titanium phosphate ($Li_xAl_yTi_z(PO_4)_3$) wherein 0<x<2, 0<y<1, and 0<z<3, $Li_{1+x+y}(Al_aGa_{1-a})_x(Ti_bGe_{1-b})_{2-x}Si_yP_{3-y}O_{12}$ wherein 0≤x≤1 and 0≤y≤1, lithium lanthanum titanate ($Li_xLa_yTiO_3$ wherein 0<x<2 and 0<y<3, lithium germanium thiophosphate ($Li_xGe_yP_zS_w$, 0<x<4, 0<y<1, 0<z<1 and 0<w<5, lithium nitride glass ($Li_xN_y$ wherein 0<x<4 and 0<y<2, $SiS_2$-based glass ($Li_xSi_yS_z$ wherein 0<x<3, 0<y<2, 0<z<4), $P_2S_5$-based glass ($Li_xP_yS_z$ wherein 0<x<3, 0<y<3 and 0<z<7, $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, and a garnet-based ceramic, e.g., $Li_{3+x}La_3M_2O_{12}$ wherein M=Te, Nb, or Zr, and x is an integer of 1 to 10. The oxide-based solid electrolyte may be amorphous, crystalline, or a mixed state thereof.

The solid electrolyte layer 30 further includes, for example, a binder. The binder included in the solid electrolyte layer 30 may be selected from, for example, styrene butadiene rubber (SBR), polytetrafluoroethylene, polyvinylidene fluoride, polyethylene, and the like, but is not limited thereto and any suitable binder used as the binder in the art may be used. The binder of the solid electrolyte layer 30 may be the same as or different from the binder of the cathode active material layer 12 and the anode active material layer 22.

The solid-state secondary battery 1 is manufactured by, for example, preparing the cathode layer 10, the anode layer 20 and the solid electrolyte layer 30, respectively, and then laminating these layers.

Preparation of Cathode Layer

A slurry is prepared by mixing a cathode active material, a carbon-based conductive material, a hybrid electrolyte and the like, which are materials for forming the cathode active material layer 12. The prepared slurry is coated and dried on the cathode current collector 11. The cathode layer 10 is prepared by pressing the obtained laminate. The pressing may be, for example, by roll pressing, flat pressing, pressing using a hydrostatic pressure, or the like, but is not limited thereto, and any suitable method of pressing may be used. The pressing process may be omitted. A mixture of materials constituting the cathode active material layer 12 is compacted in a pellet form or stretched (molded) in a sheet form to prepare the cathode layer 10. When the cathode layer 10 is prepared by such a method, the cathode current collector 11 may be omitted.

Preparation of Anode Layer

A slurry is prepared by adding an anode active material, a conductive material, and a binder, which are materials constituting the anode active material layer 22, to a polar solvent or a non-polar solvent. The prepared slurry is coated and dried on the anode current collector 21 to prepare a laminate. Subsequently, the dried laminate is pressed to prepare the anode layer 20. The pressing may be, for example, by roll pressing, flat pressing, or the like, but is not limited thereto, and any suitable pressing method may be used. The pressing is performed, for example, at a temperature of room temperature to 90° C. or less and a temperature of about 20° C. to about 90° C. Alternatively, the pressing is performed at a high temperature of 100° C. or more. The pressing process may be omitted. A mixture of materials constituting the anode active material layer 22 is compacted in a pellet form or stretched (molded) in a sheet form to prepare the anode layer 20. When the anode layer 20 is prepared by such a method, the anode current collector 21 may be omitted.

Preparation of Solid Electrolyte Layer

The solid electrolyte layer 30 may be prepared by, for example, a solid electrolyte made of a sulfide-based solid electrolyte material.

The sulfide-based solid electrolyte may be provided by treating a starting material by, for example, a melt-quenching method, a mechanical milling method, or the like, but the present disclosure is not necessarily limited to these methods, and any suitable preparing methods of the sulfide-based solid electrolyte used in the art may be used. For example, when the melt-quenching method is used, a small amount of starting material such as $Li_2S$ and $P_2S_5$ is mixed to form a pellet shape, and then reacted in a vacuum at a predetermined reaction temperature, and quenched to prepare a sulfide-based solid electrolyte material. Further, the reaction temperature of the mixture of $Li_2S$ and $P_2S_5$ is, for example, about 400° C. to about 1000° C., or about 800° C. to about 900° C. The reaction time is, for example, about 0.1 hours to about 12 hours, or about 1 hours to about 12 hours. The quenching temperature of the reactant is 10° C. or lower, or 0° C. or lower, and the quenching rate is about 1° C./sec to about 10000° C./sec, or about 1° C./sec to about 1000° C./sec. For example, when mechanical milling is used, the sulfide-based solid electrolyte material is prepared by stirring and reacting starting materials such as $Li_2S$ and $P_2S_5$ using a ball mill or the like. Although the stirring speed and stirring time of the mechanical milling method are not particularly limited, the faster the stirring speed, the faster the production rate of the sulfide-based solid electrolyte material becomes, and the longer the stirring time, the higher the conversion rate of the raw material into the sulfide-based solid electrolyte material becomes. Subsequently, the mixed raw material obtained by the melt-quenching method, the mechanical milling method or the like is heat-treated at a predetermined temperature and then pulverized to prepare a particle-shaped solid electrolyte. When the solid electrolyte has a glass transition property, the solid electrolyte may be transformed from amorphous to crystalline by heat treatment.

The solid electrolyte obtained in such a method may be deposited by using a film forming method such as an aerosol deposition method, a cold spray method, a sputtering method or the like to prepare the solid electrolyte layer 30, the details of which can be determined by one of skill in the art without undue experimentation.

Alternatively, the solid electrolyte layer 30 may be prepared by pressing a single solid electrolyte particle. Alternatively, the solid electrolyte layer 30 may be prepared by mixing and applying the solid electrolyte, the solvent, and the binder, and drying and pressing the mixture.

Preparation of Solid Secondary Battery

The cathode layer 10, the anode layer 20 and the solid electrolyte layer 30 prepared by the above-described method may be laminated and pressed so that the solid electrolyte layer 30 is located between the cathode layer 10 and the anode layer 20 to manufacture the solid-state secondary battery 1. The pressing process may be omitted.

For example, the solid electrolyte layer 30 may be located on the cathode layer 10 to prepare a laminate. Subsequently, the anode layer 20 is located on the laminate so that the solid electrolyte layer 30 and the anode active material layer are in contact with each other to prepare the laminate, and the laminate is pressed to manufacture the solid-state secondary battery 1. The pressing may be, for example, by roll pressing, flat pressing, pressing using a hydrostatic pressure, or the like, but is not limited thereto, and any suitable method of pressing may be used. The pressing is performed, for example, at a temperature of room temperature to 90° C. or less and a temperature of about 20° C. to about 90° C. Alternatively, the pressing may be performed at a high temperature of 100° C. or more. The solid electrolyte powder may be sintered to form a single, indivisible, solid electrolyte layer.

The configuration and the manufacturing method of the solid-state secondary battery 1 described above are examples, and the constituent members, the manufacturing procedure and the like may be appropriately changed.

An aspect of this disclosure will be described in more detail through the following Examples and Comparative Examples. The scope of this disclosure shall not limited by these Examples.

Synthesis of Organic Salt

Comparative Preparation Example 1: Preparation of Phosphonium Salt

An organic salt was prepared according to Reaction Scheme 1.

First, a solution obtained by dissolving 6.4 grams (g) of dihexyl(propyl) phosphine in 80 milliliters (mL) of acetonitrile and a solution obtained by dissolving 2.1 g of 1-bromohexane in 30 mL of acetonitrile were added to a 250 mL spherical flask together. The mixture was stirred at 60° C. for 6 hours to form a precipitate, a white crystal. The obtained white crystal was filtered and dried in a vacuum oven at 120° C. to obtain trihexyl(propyl)phosphonium bromide. The yield of trihexyl(propyl)phosphonium bromide was about 90% based on weight.

Next, a solution obtained by dissolving 7.4 g of trihexyl (propyl)phosphonium bromide in 80 mL of acetone and a solution obtained by dissolving 6.6 g of lithium bis(trifluoromethanesulfonyl)imide (LiTFSi) in 50 mL of acetone were added to a 250 mL spherical flask together. The mixture was stirred at room temperature (20° C.) for 18 hours to form a precipitate, a white crystal. The obtained white crystal was filtered and dried in a vacuum oven at 120° C. to obtain trihexyl(propyl) phosphonium bis(trifluoromethanesulfonyl)imide (TFSI) represented by Formula 15 below. The yield of trihexyl(propyl) phosphonium TFSI was about 90% based on weight.

The structure of the synthesized compound was confirmed by nuclear magnetic resonance spectroscopy (NMR) and mass spectrometry (MS).

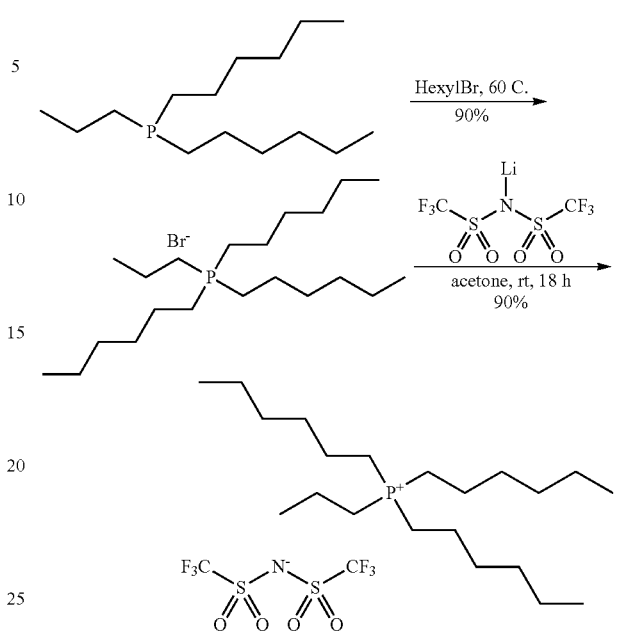

Preparation Example 1: Preparation of Fluorinated Phosphonium Salt

An organic salt was prepared according to Reaction Scheme 2.

First, a solution obtained by dissolving 5.0 g of dihexyl (propyl) phosphine in 50 mL of acetonitrile, and a solution obtained by dissolving 6 g of 1-iodo-3,3,4,4,5,5,6,6,7,7,7-undecafluoroheptane in 50 mL of acetonitrile were added to a 250 spherical flask together. The mixture was stirred at 80° C. for 12 hours to form a precipitate, a white crystal. The obtained white crystal was filtered and dried in a vacuum oven at 120° C. to obtain dihexyl(propyl)(3,3,4,4,5,5,6,6,7,7,7-undecafluoroheptyl)phosphonium iodide. The yield of dihexyl(propyl)(3,3,4,4,5,5,6,6,7,7,7-undecafluoroheptyl) phosphonium iodide was about 80% based on weight.

Next, a solution obtained by dissolving 9.2 g of dihexyl (propyl)(3,3,4,4,5,5,6,6,7,7,7-undecafluoroheptyl)phosphonium iodide in 100 mL of acetone and a solution obtained by dissolving 4.5 g of lithium bis(trifluoromethanesulfonyl) imide (LiTFSi) in 40 mL of acetone were added to a 250 spherical flask together. The mixture was stirred at room temperature (20° C.) for 18 hours to form a precipitate, a white crystal. The obtained white crystal was filtered and dried in a vacuum oven at 120° C. to obtain dihexyl(propyl) (3,3,4,4,5,5,6,6,7,7,7-undecafluoroheptyl)phosphonium TFSI. The yield of dihexyl(propyl)(3,3,4,4,5,5,6,6,7,7,7-undecafluoroheptyl)phosphonium TFSI was about 90% based on weight.

The structure of the synthesized compound was confirmed by NMR and MS.

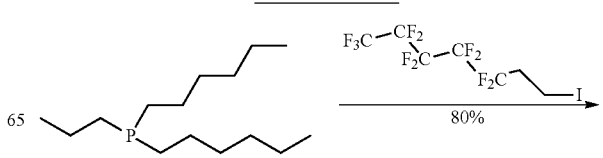

-continued

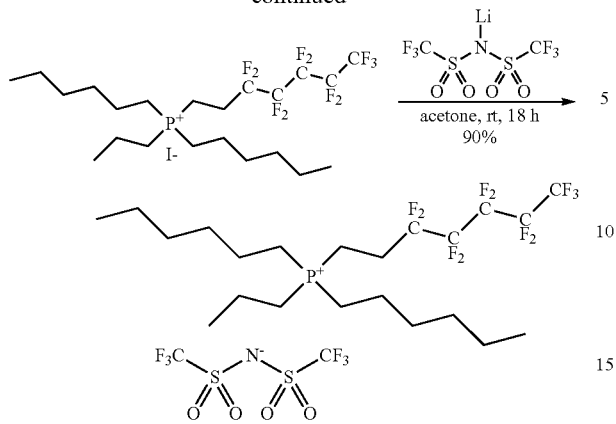

Preparation Example 2: Preparation of Fluorinated Phosphonium Salt

An organic salt represented by Formula A was prepared according to the following method.

First, a solution obtained by dissolving 6.4 g of dihexyl (propyl) phosphine in 80 mL of acetonitrile and a solution obtained by dissolving 11.5 g of 1-iodo-3,3,4,4,5,5,6,6,7,7,7-undecafluoroheptane in 30 mL of acetonitrile were added to a 250 mL spherical flask together. The mixture was stirred at 80° C. for 12 hours to form a precipitate, a white crystal. The obtained white crystal was filtered and dried in a vacuum oven at 120° C. to obtain dihexyl(propyl)(3,3,4,4,5,5,6,6,7,7,7-undecafluoroheptyl)phosphonium iodide. The yield of dihexyl(propyl)(3,3,4,4,5,5,6,6,7,7,7-undecafluoroheptyl)phosphonium iodide was about 90% based on a weight.

Next, a solution obtained by dissolving 5.0 g of dihexyl (propyl)(3,3,4,4,5,5,6,6,7,7,7-undecafluoroheptyl)phosphonium iodide in 50 mL of acetonitrile and a solution obtained by dissolving 12.2 g of 1-iodo-3,3,4,4,5,5,6,6,7,7,7-undecafluoroheptane in 50 mL of acetonitrile were added to a 250 mL spherical flask together. The mixture was stirred at 80° C. for 6 hours to form a precipitate, a white crystal. The obtained white crystal was filtered and dried in a vacuum oven at 120° C. to obtain dihexyl (3,3,4,4,5,5,6,6,7,7,7-undecafluoroheptyl)phosphonium iodide. The yield of dihexyl (3,3,4,4,5,5,6,6,7,7,7-undecafluoroheptyl)phosphonium iodide was about 90% based on weight.

Next, a solution obtained by dissolving 5 g of dihexyl(di-(3,3,4,4,5,5,6,6,7,7,7-undecafluoroheptyl))phosphonium iodide in 50 mL of acetone and a solution obtained by dissolving 3.2 g of lithium bis(trifluoromethanesulfonyl) imide (LiTFSi) in 20 mL of acetone were added to a 250 mL spherical flask together. The mixture was stirred at room temperature (20° C.) for 18 hours to form a precipitate, a white crystal. The obtained white crystal was filtered and dried in a vacuum oven at 120° C. to obtain dihexyl(di-(3,3,4,4,5,5,6,6,7,7,7-undecafluoroheptyl))phosphonium TFSI represented by Formula A. The yield of dihexyl(di-(3,3,4,4,5,5,6,6,7,7,7-undecafluoroheptyl))phosphonium TFSI was about 90% based on weight.

The structure of the synthesized compound was confirmed by NMR and MS.

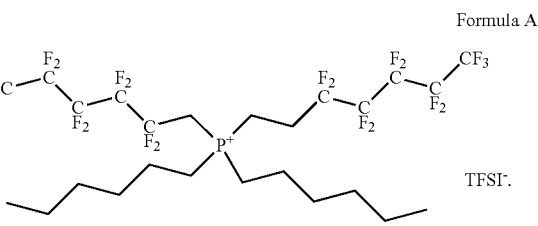

Formula A

Preparation Example 3: Preparation of Fluorinated Imidazolium Salt

An organic salt was prepared according to Reaction Scheme 3 below.

First, a solution obtained by dissolving 8.0 g of N-methylimidzole in 70 mL of toluene and a solution obtained by dissolving 11 g of 1-iodo-3,3,4,4,5,5,6,6,7,7,8,8,8-tridecafluorooctane in 80 mL of toluene were added to a 250 mL spherical flask together. The mixture was stirred at 90° C. for 36 hours to form a precipitate, a white crystal. The obtained white crystal was filtered and dried in a vacuum oven at 120° C. to obtain N-methyl-N'-3,3,4,4,5,5,6,6,7,7,8,8,8-tridecafluorooctyl)imidazolium iodide. The yield of N-methyl-N'-3,3,4,4,5,5,6,6,7,7,8,8,8-tridecafluorooctyl)imidazolium iodide was about 65% based on weight.

Next, a solution obtained by dissolving 8.4 g of N-methyl-N'-(3,3,4,4,5,5,6,6,7,7,8,8,8-tridecafluorooctyl)imidazolium iodide in 80 mL of acetone and a solution obtained by dissolving 3.6 g of lithium bis(trifluoromethanesulfonyl) imide (LiTFSi) in 20 mL of acetone were added to a 250 mL spherical flask together. The mixture was stirred at room temperature (20° C.) for 18 hours to form a precipitate, a white crystal. The obtained white crystal was filtered and dried in a vacuum oven at 120° C. to obtain N-methyl-N'-(3,3,4,4,5,5,6,6,7,7,8,8,8-tridecafluorooctyl)imidazolium TFSI. The yield of N-methyl-N'-(3,3,4,4,5,5,6,6,7,7,8,8,8-tridecafluorooctyl)imidazolium TFSI was about 95% based on weight.

The structure of the synthesized compound was confirmed by NMR and MS.

Reaction Scheme 3

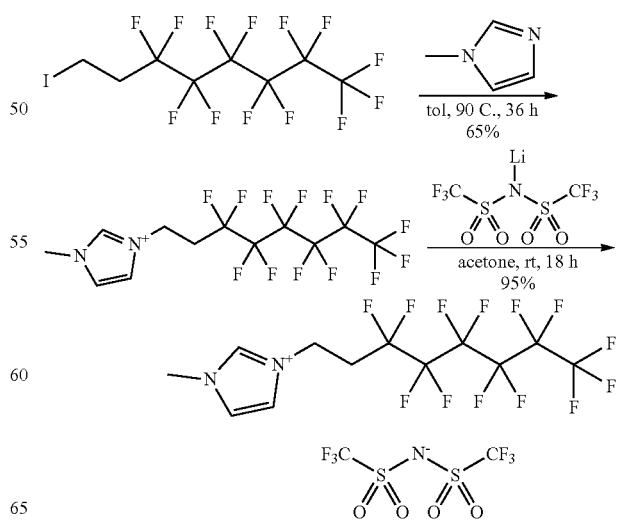

Preparation Example 4: Preparation of Fluorinated Piperidinium Salt

An organic salt was prepared according to Reaction Scheme 4.

First, a solution obtained by dissolving 12 g of N-methyl-N-propyl piperidinium iodide in 100 mL of toluene and a solution obtained by dissolving 18.1 g of 1-iodo-3,3,4,4,5,5,6,6,7,7,8,8,8-tridecafluorooctane in 80 mL of toluene were added to a 250 mL spherical flask together. The mixture was stirred at 90° C. for 26 hours to form a precipitate, a white crystal. The obtained white crystal was filtered and dried in a vacuum oven at 120° C. to obtain N-propyl-N'-3,3,4,4,5,5,6,6,7,7,8,8,8-tridecafluorooctyl)piperidinium iodide. The yield of N-propyl-N'-3,3,4,4,5,5,6,6,7,7,8,8,8-tridecafluorooctyl)piperidinium iodide was about 65% based on a weight.

Next, a solution obtained by dissolving 9.2 g of N-propyl-N'-3,3,4,4,5,5,6,6,7,7,8,8,8-tridecafluorooctyl)piperidinium iodide in 100 mL of acetone and a solution obtained by dissolving 3.5 g of lithium bis(trifluoromethanesulfonyl)imide (LiTFSi) in 50 mL of acetone were added to a 250 mL spherical flask together. The mixture was stirred at room temperature (20° C.) for 18 hours to form a precipitate, a white crystal. The obtained white crystal was filtered and dried in a vacuum oven at 120° C. to obtain N-propyl-N'-3,3,4,4,5,5,6,6,7,7,8,8,8-tridecafluorooctyl)piperidinium TFSI. The yield of N-propyl-N'-3,3,4,4,5,5,6,6,7,7,8,8,8-tridecafluorooctyl)piperidinium TFSI was about 95% based on a weight.

The structure of the synthesized compound was confirmed by NMR and MS.

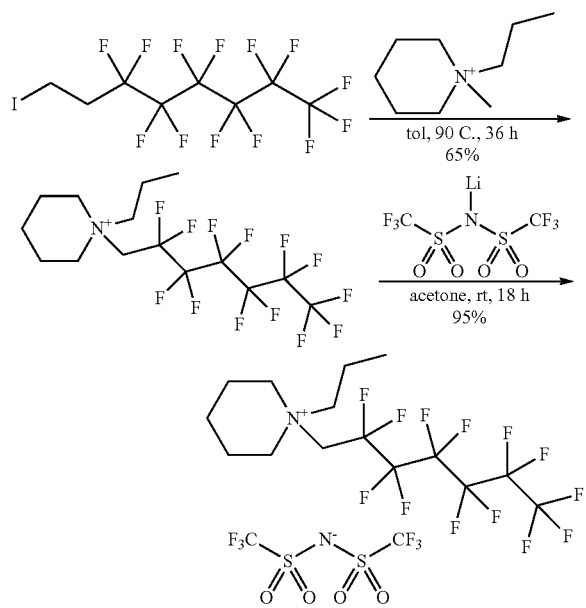

Reaction Scheme 4

Comparative Preparation Example 2

N-methyl-N-propyl piperidinium TFSI was obtained commercially and used as received.

Comparative Preparation Example 3

Imid14 TFSI (1-butyl 3-methylimidazolium bistrifluoromethanesulfonimide) was obtained commercially and used as received.

Preparation of Hybrid Electrolyte of Sulfide-Based Solid Electrolyte and Organic Salt

Example 1

An organic electrolyte in which LiTFSI 1.0 M as a lithium salt was dissolved in the organic salt prepared in Preparation Example 1 and $Li_6PS_5Cl$ powder as a sulfide solid electrolyte having an argyrodite type crystal structure were mixed at a weight ratio of 10:90 at 60° C. and then cooled to room temperature to prepare a hybrid electrolyte. The hybrid electrolyte was a solid at room temperature.

Examples 2 to 4

Hybrid electrolytes were prepared in the same manner as in Example 1, respectively, except that the organic salts prepared in Preparation Examples 2 to 4 were used.

Comparative Examples 1 to 3

Hybrid electrolytes were prepared in the same manner as in Example 1, respectively, except that the organic salts prepared in Comparative Preparation Examples 1 to 3 were used.

Comparative Example 4

A pellet obtained by pressing $Li_6PS_5Cl$ powder as a sulfide solid electrolyte having an argyrodite type crystal structure was used as a solid electrolyte.

Preparation of Hybrid Electrolyte of Oxide-Based Solid Electrolyte and Organic Salt

Example 5

An organic electrolyte in which LiTFSI 1.0 M as a lithium salt was dissolved in the organic salt prepared in Preparation Example 1 and lithium aluminum titanium phosphate (LATP) as an oxide-based solid were mixed at a weight ratio of 10:90 at 60° C. and then cooled to room temperature to prepare a hybrid electrolyte. The hybrid electrolyte was a solid at room temperature.

Examples 6 to 8

Hybrid electrolytes were prepared in the same manner as in Example 5, respectively, except that the organic salts prepared in Preparation Examples 2 to 4 were used.

Comparative Examples 5 to 7

Hybrid electrolytes were prepared in the same manner as in Example 5, respectively, except that the organic salts prepared in Comparative Preparation Examples 1 to 3 were used.

Comparative Example 8

A pellet obtained by pressing lithium aluminum titanium phosphate (LATP) as an oxide-based solid electrolyte was used as a solid electrolyte.

Preparation of Electrode

Example 9: Cathode Including Hybrid Electrolyte $LiNi_{0.8}Co_{0.15}Mn_{0.05}O_2$ (NCM) was prepared as a cathode active material. $Li_6PS_5Cl$ which was an argyrodite type crystal was prepared as a solid electrolyte. An organic electrolyte prepared by dissolving LiTFSI 1.0 M in the organic salt prepared in Preparation Example 1 and the solid electrolyte were mixed at a weight ratio of 1:1 at 60° C. and then cooled to room temperature to prepare a hybrid electrolyte. Carbon nanofiber (CNF) was prepared as a conductive agent. These materials were mixed at a weight ratio of cathode active material:hybrid electrolyte:conductive agent=90:8:2, and the mixture was molded into a sheet form to prepare a cathode sheet. The prepared cathode sheet was pressed on both sides of a cathode current collector made of a carbon-coated aluminum foil having a thickness of 18 μm to prepare a cathode. The thickness of the cathode active material layer included in the cathode was about 100 μm. The density of the prepared cathode active material layer was 3.04 g/cm³.

Comparative Example 9: Cathode Including Solid Electrolyte $LiNi_{0.8}Co_{0.15}Mn_{0.05}O_2$ (NCM) was prepared as a cathode active material. $Li_6PS_5Cl$ which was an argyrodite type crystal was prepared as a solid electrolyte. Carbon nanofiber (CNF) was prepared as a conductive agent. These materials were mixed at a weight ratio of cathode active material:solid electrolyte:conductive agent=90:8:2, and the mixture was molded into a sheet form to prepare a cathode sheet. The prepared cathode sheet was pressed on both sides of a cathode current collector made of a carbon-coated aluminum foil having a thickness of 18 μm to prepare a cathode. The thickness of the cathode active material layer included in the cathode was about 100 μm. The density of the prepared cathode was 2.87 g/cm³.

Preparation of Solid-State Battery

Example 10

Preparation of Cathode Layer $LiNi_{0.8}Co_{0.15}Mn_{0.05}O_2$ (NCM) was prepared as a cathode active material. $Li_6PS_5Cl$ which was an argyrodite type crystal was prepared as a solid electrolyte. An organic electrolyte prepared by dissolving LiTFSI 1.0 M in the organic salt prepared in Preparation Example 1 and the solid electrolyte were mixed at a weight ratio of 1:1 at 60° C. and then cooled to room temperature to prepare a hybrid electrolyte. As the binder, a polytetrafluoroethylene (PTFE) binder (Teflon binder made by DuPont) was prepared. Carbon nanofiber (CNF) was prepared as a conductive agent. These materials were mixed at a weight ratio of cathode active material:hybrid electrolyte:conductive agent:binder=88.5:8:2:1.5, and the mixture was molded into a sheet form to prepare a cathode sheet. The prepared cathode sheet was pressed on both sides of a cathode current collector made of a carbon-coated aluminum foil having a thickness of 18 μm to prepare a cathode layer.

Preparation of Anode Layer

A Ni foil having a thickness of 10 μm was prepared as an anode current collector. Further, furnace black (FB-C) having a primary particle size of about 76 nm was prepared as an anode active material. 4 g of furnace black powder was added in a vessel and 4 g of an n-methyl pyrrolidone (NMP) solution including 5 weight percent (wt %) of a PVDF binder (Product 9300 from Kureha Co., Ltd.) was added thereto to prepare a mixture. Subsequently, NMP was gradually added to the mixture while stirring the mixture to prepare a slurry. NMP was added until the viscosity of the slurry became suitable for film formation by a blade coater. The prepared slurry was applied to a Ni foil using a blade coater and dried in air at 80° C. for 20 minutes. The laminate obtained above was vacuum-dried at 100° C. for 12 hours. The dried laminate was roll-pressed at room temperature to planarize the surface of a first anode active material layer of the laminate. An anode layer was prepared by the above-described process.

Preparation of Solid Electrolyte Layer 1 part by weight of a styrene-butadiene rubber (SBR) binder was added to a $Li_6PS_5Cl$ solid electrolyte with respect to 100 parts by weight of the solid electrolyte to prepare a mixture. A slurry was prepared by adding xylene and diethylbenzene to the prepared mixture while stirring. The prepared slurry was applied to a nonwoven fabric using a blade coater and dried at 40° C. in air to obtain a laminate. The obtained laminate was vacuum-dried at 40° C. for 12 hours. A solid electrolyte layer was prepared by the above process.

Preparation of Solid-State Secondary Battery

A solid electrolyte layer was disposed on a cathode layer, and an anode layer was disposed on the solid electrolyte layer so that an anode active material layer was in contact with the solid electrolyte layer to prepare a laminate. The prepared laminate was pressed. By this pressing, the solid electrolyte layer was sintered to improve battery characteristics.

Evaluation Example 1: Measurement of Dielectric Constant

The dielectric constants were measured for the organic salts prepared in Preparation Examples 1 to 4 and Comparative Preparation Examples 1 to 3, and the results were shown in Table 1 below. The dielectric constants were measured using a BI-870 dielectric constant measurement 2 probe (Brookhaven USA).

TABLE 1

|  | Dielectric constant |
|---|---|
| Comparative Preparation Example 1 | 13.8 |
| Comparative Preparation Example 2 | 12.0 |
| Comparative Preparation Example 3 | 15.7 |
| Preparation Example 1 | 8.2 |
| Preparation Example 2 | 6.3 |

TABLE 1-continued

|  | Dielectric constant |
| --- | --- |
| Preparation Example 3 | 4.8 |
| Preparation Example 4 | 7.5 |

As shown in Table 1, the organic salts prepared in Preparation Examples 1 to 4 were lowered in the dielectric constant as compared with the organic salts prepared in Comparative Preparation Examples 1 to 3.

Evaluation Example 2: Measurement of Viscosity

The viscosities of the organic salts prepared in Preparative Examples 1 to 4 and Comparative Preparative Example 1 were measured at 25° C. using a viscometer (Brookfield DV-II+PRO Viscometer) and the results were shown in Table 2 below.

TABLE 2

|  | Viscosity [cps] |
| --- | --- |
| Comparative Preparation Example 1 | 230 |
| Preparation Example 1 | 1950 |
| Preparation Example 2 | 5700 |
| Preparation Example 3 | 2240 |
| Preparation Example 4 | 2930 |

As shown in Table 2, the organic salts prepared in Preparation Examples 1 to 4 were increased in the viscosity as compared with the organic salt prepared in Comparative Preparation Example 1.

Evaluation Example 3: Measurement of Ionic Conductivity

The ionic conductivities of the hybrid electrolytes prepared in Examples 1, 3 and 4 and Comparative Examples 1 and 4 were measured at 60° C. and the results were shown in Table 3.

A separator layer impregnated with a liquid electrolyte (1M LiTFSI in propylene carbonate (PC)) was disposed on both surfaces of the hybrid electrolyte, and then stainless steel was located on the electrolyte layer as a current collector to complete an electron blocking cell. Ionic conductivity was measured using a DC polarization method.

A time dependent current obtained when a constant voltage of 100 mV was applied to the completed symmetric cell for 30 minutes was measured. After calculating the ion resistance of the cell from the measured current, the ionic resistance of the hybrid electrolyte was calculated by subtracting the ion resistance of the separator layer from the ion resistance of the cell to calculate the ionic conductivity. Further, Ionic conductivity was measured using an AC Impedance method. Au electrode was disposed on both surfaces of the hybrid electrolyte, and then stainless steel was located on the electrode as a current collector to complete a symmetry cell. When measured by a AC impedance method at 60° C., an average ionic conductivity in the range of about $10^3$ Hertz to about $10^5$ Hertz in a conductivity-frequency graph was used as ionic conductivity of the electrolytes. Result by the two methods was similar. Some of the obtained ion conductivities using the AC Impedance method were shown in Table 3.

TABLE 3

|  | Ionic conductivity [mS/cm] |
| --- | --- |
| Comparative Example 1 | 6.5 |
| Comparative Example 4 | 13.06 |
| Example 1 | 10.9 |
| Example 3 | 9.7 |
| Example 4 | 8.4 |

As shown in Table 3, the hybrid electrolytes prepared in Examples 1, 3 and 4 including fluorine-containing organic cations had improved ionic conductivity as compared with the hybrid electrolyte prepared in Comparative Example 1.

In addition, the hybrid electrolytes prepared in Examples 1, 3, and 4 exhibited ionic conductivity of 50% or more as compared with the solid electrolyte prepared in Comparative Example 4.

Evaluation Example 4: Evaluation of Electrochemical Potential Window

With respect to the hybrid electrolytes prepared in Examples 1 to 4 and Comparative Example 2, oxidation currents to a lithium metal were measured up to 5.5 V using a linear sweep cyclic voltammetry.

The measurement results were shown in FIG. 1 and Table 4 below. The maximum voltage (V vs. Li) at which the oxidation current was kept at $1\times10^{-5}$ A/cm$^2$ or less was shown in Table 4 below.

TABLE 4

|  | Voltage [V (vs. Li)] |
| --- | --- |
| Comparative Example 2 | 3.8 |
| Example 1 | 4.4 |
| Example 2 | 4.5 |
| Example 3 | 4.5 |
| Example 4 | 4.5 |

As shown in FIG. 1 and Table 4, the hybrid electrolytes of Examples 1 to 4 were increased in an electrochemically stable voltage range as compared with the hybrid electrolyte of Comparative Example 2.

Accordingly, the hybrid electrolytes of Examples 1 to 4 were improved in the electrochemical stability compared with the hybrid electrolyte of Comparative Example 2.

Evaluation Example 5: Evaluation (1) of Electrolyte Reactivity

The organic salts prepared in Preparation Examples 1 to 4 and Comparative Preparation Examples 1 and 3 and the Li$_6$PS$_5$Cl solid electrolyte powder as an argyrodite type crystal were mixed at a weight ratio of 90:10 at 60° C. and then left for 12 hours to prepare hybrid electrolytes, respectively. The organic salts were separated from the hybrid electrolytes and the amount of Cl eluted in the organic salts was measured using ion coupled plasma (ICP). The measurement results were shown in Table 5.

TABLE 5

|  | Concentration [ppm] of Cl$^-$ |
| --- | --- |
| Comparative Preparation Example 1 | 159 |
| Comparative Preparation Example 3 | 278 |
| Preparation Example 1 | 4.7 |

TABLE 5-continued

| | Concentration [ppm] of Cl$^-$ |
|---|---|
| Preparation Example 2 | 5.3 |
| Preparation Example 3 | 12.9 |
| Preparation Example 4 | 4.9 |

As shown in Table 5, the hybrid electrolytes including the organic salts of Preparation Examples 1 to 4 were significantly decreased in the concentration of chloride ions eluted into the organic salts as compared with the hybrid electrolytes including the organic salt of Comparative Preparation Examples 1 and 3.

It was confirmed that the organic salts of Preparation Examples 1 to 4 were significantly lowered in the reactivity with the sulfide-based solid electrolyte.

Evaluation Example 6: Evaluation (2) of Electrolyte Reactivity

Figure 2:
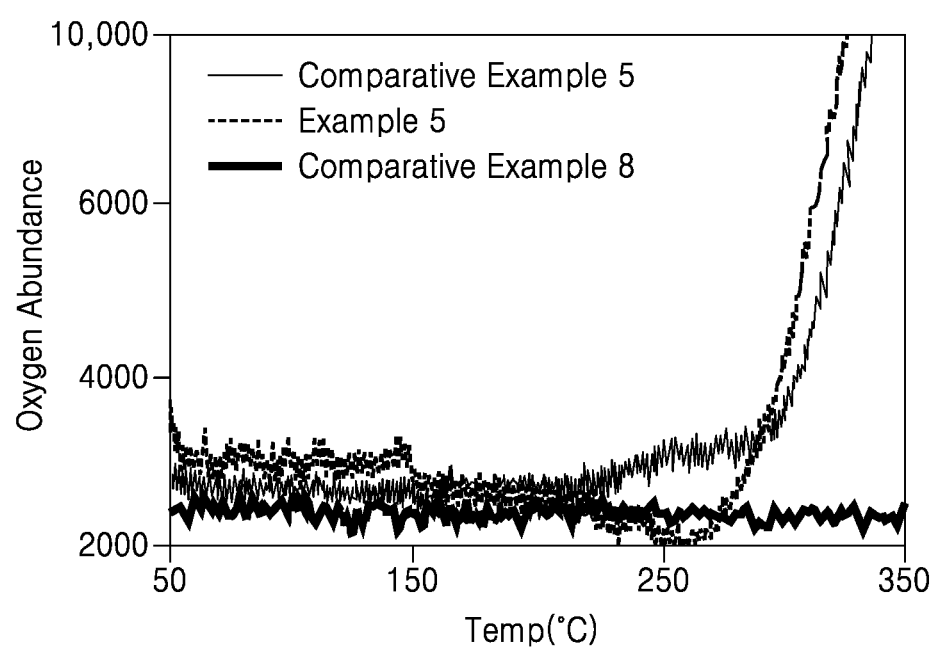
FIG. 2 is a graph of oxygen abundance versus temperature showing the results of EGA analysis of hybrid electrolytes prepared in Example 5 and Comparative Examples 5 and 8.

With respect to the hybrid electrolytes prepared in Examples 5 to 8 and Comparative Examples 5 to 8, the amount of oxygen released by using an evolved gas analysis-mass spectroscopy (EGA-MS) was measured while the temperature was raised from 50° C. to 350° C., and some of the results were shown in FIG. 2.

As shown in FIG. 2, the hybrid electrolyte of Example 5 including the organic salt of Preparation Example 1 had reduced oxygen production up to 250° C. and increased oxygen production thereafter, but the hybrid electrolyte of Comparative Example 5 including the organic salt of Comparative Preparation Example 1 had increased oxygen production from around 200° C. The reactivity of the hybrid electrolyte of Example 5 with the oxide-based electrolyte was relatively lowered as compared with the hybrid electrolyte of Comparative Example 5. In the oxygen-based solid electrolyte of Comparative Example 8, the oxygen was hardly produced.

Evaluation Example 7: Charge and Discharge Test

The charge and discharge characteristics of the solid-state secondary battery manufactured in Example 10 were evaluated by the following charge and discharge test. The charge and discharge test was performed by putting the solid-state secondary battery in a thermostat at 60° C.

A first cycle was charged for 12.5 hours at a constant current of 0.5 mA/cm$^2$ until a battery voltage reached 4.3 V. Then, the discharge was performed for 12.5 hours at a constant current of 0.5 mA/cm$^2$ until the battery voltage reached 2.0 V.

Further, a second cycle, the charging and discharging were performed in the same conditions as those of the first cycle. It was confirmed that the solid-state secondary battery operated normally.

As described above, the disclosed solid-state secondary battery may be applied to various portable devices, vehicles, and the like.

The disclosed hybrid electrolyte may be used to provide a lithium battery with improved energy density which prevents a contact failure of the electrode by the hybrid electrolyte.

It should be understood that the disclosed embodiment described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A hybrid electrolyte comprising:
   an inorganic solid electrolyte; and
   an organic electrolyte,
   wherein the organic electrolyte includes an organic salt including an organic cation and an anion, and the organic cation includes a halogen,
   wherein the hybrid electrolyte is solid at room temperature,
   wherein the organic cation comprises at least one cation of a Group 15 element cation or a heterocyclic cation including 1 to 3 hetero atoms,
   wherein at least one hydrocarbyl group substituted with a halogen is linked to the Group 15 element and to the heterocyclic cation, and
   wherein the at least one hydrocarbyl group substituted with the halogen comprises a C6-C12 alkyl group and at least five carbons of the C6-C12 alkyl group are partially or fully substituted with the halogen.

2. The hybrid electrolyte of claim 1,
   wherein the organic salt of the hybrid electrolyte is represented by at least one of Formula 1 and Formula 2:

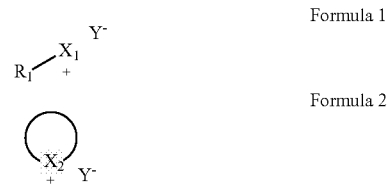

wherein, in Formula 1,
   $X_1$ is —N($R_2$)($R_3$)($R_4$) or —P($R_2$)($R_3$)($R_4$), and
   $R_1$, $R_2$, $R_3$ and $R_4$ are each independently an unsubstituted or halogen-substituted C1-C30 alkyl group, an unsubstituted or halogen-substituted C1-C30 alkoxy group, an unsubstituted or halogen-substituted C6-C30 aryl group, an unsubstituted or halogen-substituted C6-C30 aryloxy group, an unsubstituted or halogen-substituted C3-C30 heteroaryl group, an unsubstituted or halogen-substituted C3-C30 heteroaryloxy group, an unsubstituted or halogen-substituted C4-C30 cycloalkyl group, an unsubstituted or halogen-substituted C3-C30 heterocycloalkyl group, or an unsubstituted or halogen-substituted C2-C100 alkylene oxide group,
   with the proviso that at least one of $R_1$, $R_2$, $R_3$ and $R_4$ is the C6-C12 alkyl group partially or fully substituted with the halogen, and
   in Formula 2,

is a heterocycloalkyl group or a heteroaryl group, each including 1 to 3 heteroatoms and 2 to 30 carbon atoms, in which the ring is unsubstituted or substituted with a sub substituent, $X_2$ is —N($R_5$)($R_6$)—, —N($R_5$)═, —P($R_5$)═, or —P($R_5$)($R_6$)—, and the substituent substituted in the ring, and $R_5$ and $R_6$ are each independently hydrogen, an unsubstituted or halogen-substituted C1-C30 alkyl group, an unsubstituted or halogen-substituted C1-C30 alkoxy group, an unsubstituted or halogen-substituted C6-C30 aryl group, an unsubstituted or halogen-substituted C6-C30 aryloxy group, an unsubstituted or halogen-substituted C3-C30 heteroaryl group, an unsubstituted or halogen-substituted C3-C30 heteroaryloxy group, an unsubstituted or halogen-substituted C4-C30 cycloalkyl group, an unsubstituted or halogen-substituted C3-C30 heterocycloalkyl group, or an unsubstituted or halogen-substituted C2-C100 alkylene oxide group, with the proviso that at least one of the substituents substituted in the ring and $R_5$ and $R_6$ is the C6-C12 alkyl group having at least 5 carbons partially or fully substituted with the halogen, and $Y^-$ is an anion.

3. The hybrid electrolyte of claim 1,
wherein the organic salt is represented by at least one of Formula 3 and Formula 4:

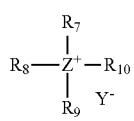

Formula 3

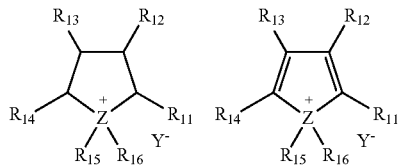

Formula 4

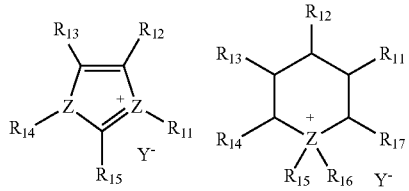

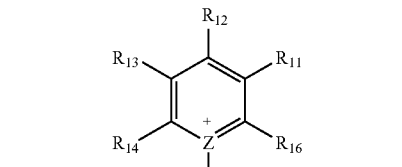

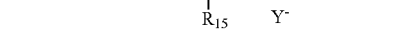

wherein, in Formula 3, Z is N or P, and $R_7$, $R_8$, $R_9$, and $R_{10}$ are each independently an unsubstituted or halogen-substituted C1-C30 alkyl group, an unsubstituted or halogen-substituted C6-C30 aryl group, an unsubstituted or halogen-substituted C3-C30 heteroaryl group, an unsubstituted or halogen-substituted C4-C30 cycloalkyl group, or an unsubstituted or halogen-substituted C3-C30 heterocycloalkyl group, with the proviso that at least one of $R_7$, $R_8$, $R_9$, and $R_{10}$ is a C6-C12 alkyl group partially or fully substituted with halogens or a C6-C30 aryl group partially or fully substituted with halogens, and in Formula 4, Z is N or P, and $R_{11}$, $R_{12}$, $R_{13}$, $R_{14}$, $R_{15}$, $R_{16}$, and $R_{17}$ are each independently hydrogen, an unsubstituted or halogen-substituted C1-C30 alkyl group, an unsubstituted or halogen-substituted C6-C30 aryl group, an unsubstituted or halogen-substituted C3-C30 heteroaryl group, an unsubstituted or halogen-substituted C4-C30 cycloalkyl group, or an unsubstituted or halogen-substituted C3-C30 heterocycloalkyl group, with the proviso that at least one of $R_{11}$, $R_{12}$, $R_{13}$, $R_{14}$, $R_{15}$, $R_{16}$, and $R_{17}$ is the C6-C12 alkyl group having at least 5 carbons partially or fully substituted with the halogen, and $Y^-$ is an anion.

4. The hybrid electrolyte of claim 1,
wherein the organic salt is represented by at least one of Formula 5 to Formula 10:

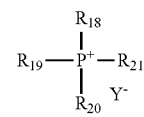

Formula 5

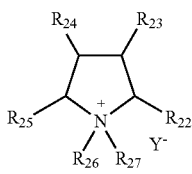

Formula 6

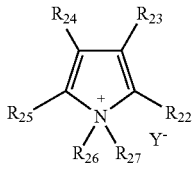

Formula 7

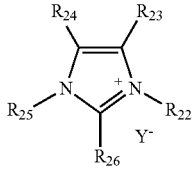

Formula 8

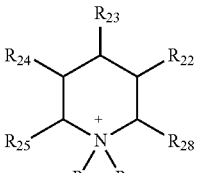

Formula 9

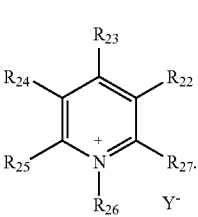

Formula 10 wherein, in Formulas 5 to 10, $R_{18}$, $R_{19}$, $R_{20}$, and $R_{21}$ are each independently an unsubstituted or halogen-substituted C1-C30 alkyl group, an unsubstituted or halogen-substituted C6-C30 aryl group, an unsubstituted or halogen-substituted C3-C30 heteroaryl group, an unsubstituted or halogen-substituted C4-C30 cycloalkyl group, or an unsubstituted or halogen-substituted C3-C30 heterocycloalkyl group, with the proviso that at least one of $R_{18}$, $R_{19}$, $R_{20}$, and $R_{21}$ is a C6-C12 alkyl group partially or fully substituted with halogens or a C6-C30 aryl group partially or fully substituted with halogens, $R_{22}$, $R_{23}$, $R_{24}$, $R_{25}$, $R_{26}$, $R_{27}$, and $R_{28}$ are each independently hydrogen, an unsubstituted or halogen-substituted C1-C30 alkyl group, an unsubstituted or halogen-substituted C6-C30 aryl group, an unsubstituted or halogen-substituted C3-C30 heteroaryl group, an unsubstituted or halogen-substituted C4-C30 cycloalkyl group, or an unsubstituted or halogen-substituted C3-C30 heterocycloalkyl group, with the proviso that at least one of $R_{22}$, $R_{23}$, $R_{24}$, $R_{25}$, $R_{26}$, $R_{27}$, and $R_{28}$ is the C6-C12 alkyl group having at least 5 carbons partially or fully substituted with the halogen, and $Y^-$ is an anion.

5. The hybrid electrolyte of claim 1,
wherein the halogen included in the organic cation is fluorine.

6. The hybrid electrolyte of claim 1,
wherein the anion includes at least one of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^-$, $PF_6^-$, $ClO_4^-$, $BOB^-$ (bis(oxalate)borate), $CF_3SO_3^-$, $CF_3CO_2^-$, $(C_2F_5SO_2)_2N^-$, $(C_2F_5SO_2)(CF_3SO_2)N^-$, or $(CF_3SO_2)_2N^-$.

7. The hybrid electrolyte of claim 1,
wherein a viscosity of the organic salt is about 500 centipoise to about 10,000 centipoise at 25° C.

8. The hybrid electrolyte of claim 1,
wherein a dielectric constant of the organic salt is 10 or less.

9. The hybrid electrolyte of claim 1,
wherein the organic electrolyte further includes a lithium salt.

10. The hybrid electrolyte of claim 9,
wherein the lithium salt includes at least one of $LiPF_6$, $LiBF_4$, $LiCF_3SO_3$, $Li(CF_3SO_2)_2N$, $LiC_2F_5SO_3$, $Li(FSO_2)_2N$, $LiC_4F_9SO_3$, $LiN(SO_2CF_2CF_3)_2$, or compounds represented by Formulas 11 to 14:

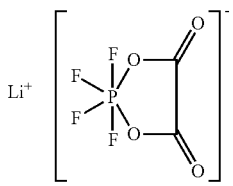

Formula 11

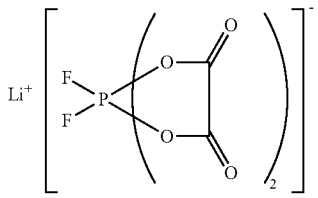

Formula 12

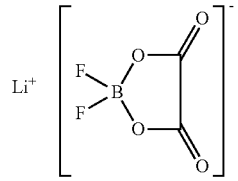

Formula 13

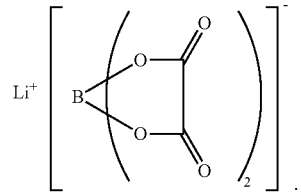

Formula 14

11. The hybrid electrolyte of claim 9,
wherein a concentration of the lithium salt included in the organic electrolyte is about 0.01 molar to about 2 molar.

12. The hybrid electrolyte of claim 1,
wherein the inorganic solid electrolyte includes at least one of a sulfide solid electrolyte or an oxide solid electrolyte.

13. The hybrid electrolyte of claim 12,
wherein the sulfide solid electrolyte comprises at least one of $Li_2S$—$P_2S_5$, $Li_2S$—$P_2S_5$—$LiX$, wherein X is a halogen element, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ wherein m and n are positive numbers and Z is one of Ge, Zn or Ga, $Li_2S$—$GeS_2$, $Li_2S$—$SiS_2$—$Li_3PO_4$, $Li_2S$—$SiS_2$-$Li_pMO_q$ wherein p and q are positive numbers, M is one of P, Si, Ge, B, Al, Ga, and In, $Li_{7-x}PS_{6-x}Cl_x$ wherein $0<x<2$, $Li_{7-x}PS_{6-x}Br_x$ wherein $0<x<2$, and $Li_{7-x}PS_{6-x}I_x$ wherein $0<x<2$, $Li_xGe_yP_zS_w$ wherein $0<x<4$, $0<y<1$, $0<z<1$, and $0<w<5$, $Li_xN_y$ wherein $0<x<4$, and $0<y<2$, $SiS_2$ glass, $Li_xSi_yS_z$ wherein $0<x<3$, $0<y<2$, and $0<z<4$, a $P_2S_5$ glass, or $Li_xP_yS_z$ wherein $0<x<3$, $0<y<3$, and $0<z<7$.

14. The hybrid electrolyte of claim 12,
wherein the oxide solid electrolyte includes at least one of $Li_{1+x+y}Al_xTi_{2-x}Si_yP_{3-y}O_{12}$ wherein $0<x<2$, $0\leq y<3$, $BaTiO_3$, $Pb(Zr_xTi_{1-x})O_3$ wherein $0\leq x\leq 1$, $Pb_{1-x}La_xZr_{1-y}Ti_yO_3$ wherein $0\leq x<1$ and $0\leq y<1$, $Pb(Mg_{3}Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ wherein $0<x<2$ and $0<y<3$, $Li_xAl_yTi_z(PO_4)_3$ wherein $0<x<2$, $0<y<1$ and $0<z<3$, $Li_{1+x+y}(Al_aGa_{(1-a)})_x(Ti_bGe_{(1-b)})_{2-x}Si_yP_{3-y}O_{12}$ wherein $0\leq x\leq 1$, $0\leq y\leq 1$, $0\leq a\leq 1$, and $0\leq b\leq 1$, $Li_xLa_yTiO_3$ wherein $0<x<2$, and $0<y<3$), $Li_2O$, $LiOH$, $Li_2CO_3$, $LiAlO_2$, a $Li_2O$—$Al_2O_3$—$SiO_2$—$P_2O_5$—$TiO_2$—$GeO_2$ ceramic, or $Li_{3+x}La_3M_2O_{12}$ wherein M is Te, Nb, or Zr, and x is an integer of 1 to 10.

15. The hybrid electrolyte of claim 1,
wherein a ratio of the inorganic solid electrolyte and the organic electrolyte is about 1:99 to about 99:1 by weight.

16. The hybrid electrolyte of claim 1,
wherein an oxidation current density of the hybrid electrolyte, as measured by linear sweep voltammetry at 25° C., is $1\times10^{-5}$ A/cm$^2$ or less up to 4.4 volts with respect to lithium metal.

17. The hybrid electrolyte of claim 1, wherein an average ionic conductivity of the hybrid electrolyte in the range of about $10^3$ Hertz to about $10^5$ Hertz, when measured by an AC impedance method at 60° C., is 50% or more of an average ionic conductivity of the inorganic solid electrolyte included in the hybrid electrolyte.

18. The hybrid electrolyte of claim 1, wherein, in the hybrid electrolyte in which the inorganic solid electrolyte and the organic electrolyte are combined at a weight ratio of 1:9 at 60° C., an amount of halogen ions eluted in to the organic electrolyte is 50 parts per million, or less.

19. An electrode comprising:

an electrode active material; and the hybrid electrolyte according to claim 1.

20. The electrode of claim 19, wherein the electrode includes a plurality of electrode active material particles, and wherein the organic electrolyte included in the hybrid electrolyte is disposed between adjacent electrode active material particles.

21. The electrode of claim 19, wherein a density of an electrode active material layer including the electrode active material and the hybrid electrolyte is 3 grams per cubic centimeter or more.

22. The electrode of claim 19, wherein the electrode active material is a cathode active material or an anode active material.

23. The electrode of claim 22, wherein the cathode active material includes a lithium transition metal oxide having a layered rock-salt structure, and wherein the anode active material includes amorphous carbon, crystalline carbon, metal, or a metalloid, each of which forms an alloy or a compound with lithium.

24. A lithium battery comprising:

a cathode layer;

an anode layer; and an electrolyte layer between the cathode layer and the anode layer, wherein at least one of the cathode layer, the anode layer, or the electrolyte layer includes the hybrid electrolyte according to claim 1.

25. The lithium battery of claim 24, wherein the electrolyte layer includes a solid electrolyte.

\* \* \* \* \*